(12) United States Patent
Kannan et al.

(10) Patent No.: US 11,543,888 B2
(45) Date of Patent: Jan. 3, 2023

(54) INTENT DETECTION WITH A COMPUTING DEVICE

(71) Applicant: GOOGLE LLC, Mountain View, CA (US)

(72) Inventors: Archana Kannan, Sunnyvale, CA (US); Roza Chojnacka, Jersey City, NY (US); Jamieson Kerns, Santa Monica, CA (US); Xiyang Luo, Mountain View, CA (US); Meltem Oktem, Sunnlyvale, CA (US); Nada Elassal, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 134 days.

(21) Appl. No.: 16/946,532

(22) Filed: Jun. 25, 2020

(65) Prior Publication Data
US 2020/0409469 A1 Dec. 31, 2020

Related U.S. Application Data

(60) Provisional application No. 62/867,389, filed on Jun. 27, 2019.

(51) Int. Cl.
*G09G 5/00* (2006.01)
*G06F 3/01* (2006.01)
(Continued)

(52) U.S. Cl.
CPC ............... *G06F 3/017* (2013.01); *G06F 3/16* (2013.01); *G06K 9/6256* (2013.01); *G06T 7/20* (2013.01);
(Continued)

(58) Field of Classification Search
CPC .. G06F 2203/0381; G06F 3/011; G06F 3/017; G06F 3/0304; G06F 3/16; G06F 3/167; G06K 9/00355; G06K 9/00389; G06K 9/00671; G06K 9/6256; G06K 9/6272; G06K 9/726; G06N 3/0454; G06N 3/08; G06Q 10/10; G06Q 30/0641;
(Continued)

(56) References Cited

U.S. PATENT DOCUMENTS 10,296,102 B1 5/2019 Misra et al.
2014/0157209 A1 6/2014 Dalal et al.
(Continued)

FOREIGN PATENT DOCUMENTS

CN 106960175 A 7/2017

OTHER PUBLICATIONS

Extended European Search Report for European Application No. 20182621.1, dated Jan. 21, 2021, 15 pages.
(Continued)

*Primary Examiner* — Insa Sadio
(74) *Attorney, Agent, or Firm* — Brake Hughes Bellermann LLP

(57) ABSTRACT

A method can perform a process with a method including capturing an image, determining an environment that a user is operating a computing device, detecting a hand gesture based on an object in the image, determining, using a machine learned model, an intent of a user based on the hand gesture and the environment, and executing a task based at least on the determined intent.

18 Claims, 18 Drawing Sheets

(51) Int. Cl.
*G06T 7/73* (2017.01)
*G06F 3/16* (2006.01)
*G06K 9/62* (2022.01)
*G06T 7/20* (2017.01)
*G06T 11/20* (2006.01)
*G06V 30/262* (2022.01)
*G06V 40/20* (2022.01)

(52) U.S. Cl.
CPC ............... *G06T 7/73* (2017.01); *G06T 11/20* (2013.01); *G06V 30/274* (2022.01); *G06V 40/28* (2022.01); *G06T 2210/12* (2013.01)

(58) Field of Classification Search
CPC ..... G06Q 50/20; G06T 11/20; G06T 2210/12; G06T 7/20; G06T 7/73
See application file for complete search history.

(56) References Cited

U.S. PATENT DOCUMENTS

| | | | |
|---|---|---|---|
| 2016/0026253 A1 | 1/2016 | Bradski et al. | |
| 2016/0266653 A1* | 9/2016 | Liu | G06F 3/0304 |
| 2019/0091570 A1* | 3/2019 | Wang | A63F 13/42 |

OTHER PUBLICATIONS

Sandler, Mark, et al., "MobileNetV2: Inverted Residuals and Linear Bottlenecks", The IEEE Conference on Computer Vision and Pattern Recognition (CVPR), 2018; (https://arxiv.org/abs/1801.04381), Mar. 21, 2019, pp. 4510-4520.

Partial European Search Report for European Application No. 20182621.1, dated Oct. 26, 2020, 16 pages.

Billinghurst, Mark, et al., "A Survey of Augmented Reality", Foundations and Trends in Human-Computer Interaction, vol. 8, No. 2-3, pp. 73-272, Mar. 2015, XP055421092.

* cited by examiner

INTENT DETECTION WITH A COMPUTING DEVICE

RELATED APPLICATION

This application claims priority to and the benefit of U.S. Provisional Patent Application No. 62/867,389, filed on Jun. 27, 2019, entitled "AUGMENTED REALITY MOUSE TO DETECT INTENT", the contents of which are incorporated in their entirety herein by reference.

FIELD

Embodiments relate to detecting an intention of a user of a computing device based on a presentation of an object (e.g., a hand, a book, an item for sale, and/or the like) as captured by a camera of the computing device.

BACKGROUND

Pointing devices in computing are used to control or activate certain elements in a user interface. On a computer, this can be achieved by using a separate controller, for example, a mouse, which can be moved on a flat surface, and the movement of the mouse translated to a pointer/cursor on the computer's screen. In addition, the mouse may have buttons to click and scroll which can enable various types of tasks, e.g., opening an application, selecting an application, scrolling down, etc. However, with the evolution of smartphones, tablets, etc., touchscreens are generally used and a finger, for example, can replace the physical controller. User actions such as tap, scroll, swipe, pinch and long press have become common patterns of interaction with smart phones, tablets, etc.

SUMMARY

In a general aspect, a device, a system, a non-transitory computer-readable medium (having stored thereon computer executable program code which can be executed on a computer system), and/or a method can perform a process with a method including capturing an image, determining an environment that a user is operating a computing device, detecting a hand gesture based on an object in the image, determining, using a machine learned model, an intent of a user based on the hand gesture and the environment, and executing a task based at least on the determined intent.

The system can include a memory storing a set of instructions, and a processor configured to execute the set of instructions to cause the system to capture an image, determine an environment that a user is operating a computing device, detect a hand gesture based on an object in the image, determine, using a machine learned model, an intent of a user based on the hand gesture and the environment, and execute a task based at least on the determined intent.

Implementations can include one or more of the following features. For example, determining the intent of the user can further include translating an interaction of the user with a real-world, and using the interaction and the hand gesture to determine the intent of the user. The machine learned model can be based on a computer vision model. A first machine learned model and a second machine learned model can be used to determine the intent of the user. The method can further include continuous tracking of a hand associated with the hand gesture using the second machine learned model. The image can be captured using a single non-depth sensing camera of a computing device. The task can be based on use of a computer assistant. The task can include at least one of a visual and audible output. The machine learned model can be trained using a plurality of images including at least one hand gesture, the machine learned model is trained using a plurality of ground-truth images of hand gestures, a loss function is used to confirm a match between a hand gesture and a ground-truth image of a hand gesture, and the detecting of the hand gesture based on the object in the image includes matching the object to the hand gesture matched to the ground-truth image of the hand gesture. The machine learned model can be trained using a plurality of images each including at least one object, and the at least one object can have an associated ground-truth box. The machine learned model can generate a plurality of bounding boxes, the machine learned model can determine a plurality of features based on at least a portion of an object within a bounding box, the machine learned model can identify the object based on the plurality of features, and the intent of the user can be determined based on the identified object.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
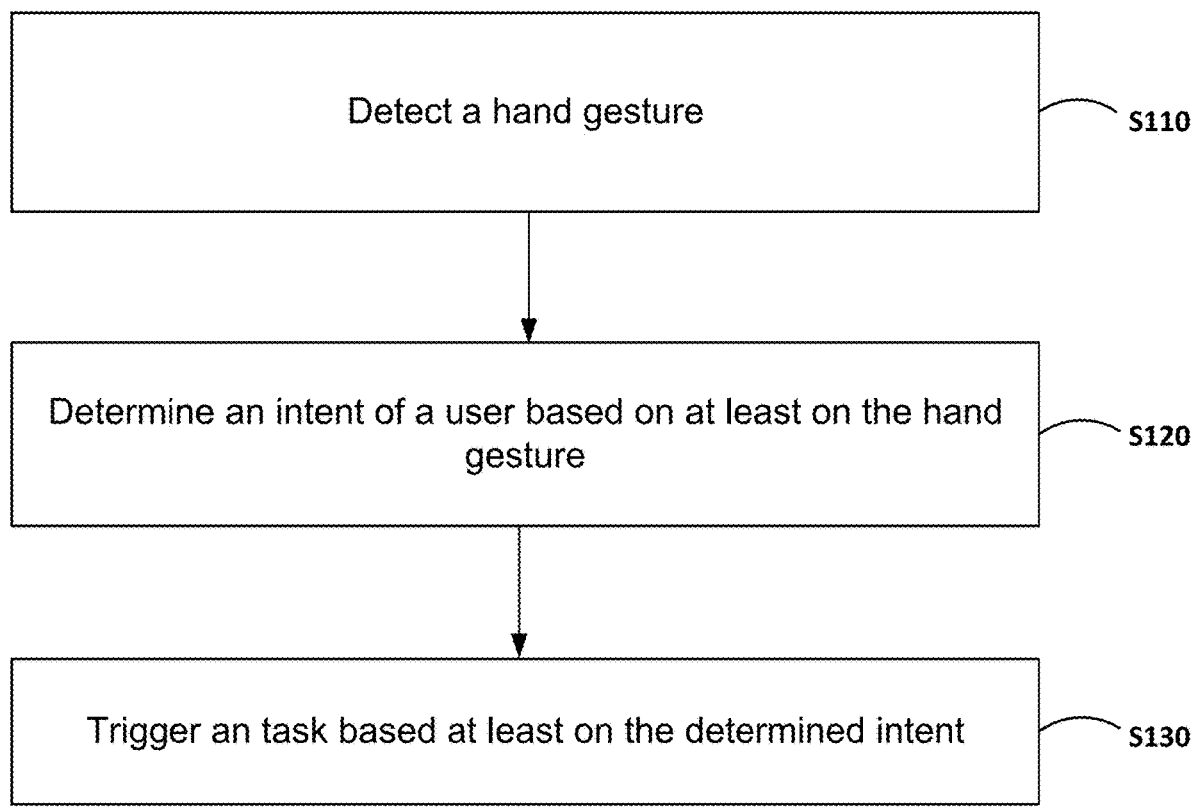
FIG. 1 illustrates a flowchart of a method for detecting a user's intent and executing a task based on the intent according to at least one example implementation.

It should be noted that these Figures are intended to illustrate the general characteristics of methods, structure and/or materials utilized in certain example embodiments and to supplement the written description provided below. These drawings are not, however, to scale and may not precisely reflect the precise structural or performance char-

DETAILED DESCRIPTION OF THE EMBODIMENTS

Some computing devices lack a screen (e.g., a display screen) and may rely on real-world interactions through the use of natural gestures (or gesture patterns) with fingers. A computing device that does not include a controller to interface with typical input devices (e.g., a mouse, a keyboard, and/or the like) can include a user interface configured to detect a user's intent via atypical (e.g., as user intent input devices) computing device component(s) (e.g., a camera). In some implementations, the user interface may detect the user's intent based on natural gestures for perceptive computing devices and trigger a task (by the computing device) based on the detected user intent.

In an augmented reality (AR) application, objects to be identified can be limited to objects generated by the AR application. For example, if 200 objects are used by the AR application, only 200 detectors are needed to identify an object. By contrast, example implementations use trained ML models to identify any possible real-world object (e.g., hand pose, product, business card, and/or the like) to determine a user's intent. Therefore, example detectors can be configured to detect and/or identify any real-world object and/or variations (e.g., pose) of the real-world object.

In some implementations, a computer vision (e.g., computer vision model) and/or a machine learned (ML) model can be used to determine the intent of a user (e.g., user's intent) from the user's hand gestures (e.g., as captured by a camera of the device). Examples of such hand gestures may include pointing, clicking, scrolling, circling, pinch zooming, tapping, swiping, and/or the like. In some implementations, user intents that are natural through pointing gestures, e.g., capturing a full paragraph within a text document by circling the full paragraph, can be supported when used, for instance, on a one-person view device (e.g., a wearable smart device, a head-mount display, and/or the like).

The user interface may translate (e.g., transform, convert, etc.) the user's interactions with the physical or digital world into a digital semantic understanding of the user's intent. The user's intent can be used to trigger tasks that apply to the physical or digital world. In some implementations, the user interface can support a procedure or mechanism for detecting hand gestures (e.g., a user holding the business card), determining the intent of the user (e.g., intent to save the business card) based on the user's intent and/or verbal commands (e.g., holding the business card in his/her hand (along with a verbal command of "save this business card"), and triggering a task based on the determined intent (e.g., to save the business card). In some example implementations, hand gestures can be used to query (e.g., instruct, inquire, and/or the like) a digital assistant about the definition of a word, ingredients in a product, or purchase an item being held in the user's hands.

In some implementations, the user interface and/or mechanism(s) described above can be integrated into the Operating System and/or System Architecture of the computing device and can be used by other Application (e.g. App) developers as a cursor or gesture input medium without the need for any physical input hardware (e.g., a mouse, a keyboard, and/or the like). In addition, the user interface and/or mechanism can be extended to interact and manipulate VR/AR world (e.g., using interactions that are not included as functions within the AR/VR application) via the semantic understanding of what the user may achieve with pointing and user gestures, for example, highlighting text. In some implementations, the user interface can detect (or help detect) hands from a first-person view perspective in a pointing position together with a location of a pointer (e.g., tip of a visible part of the index finger). In an example implementation, the user interface can be a deep neural network built on, for example, a convolutional neural network (CNN) architecture.

The methods described with regard to FIG. 1 can be performed due to the execution of software code stored in a memory (e.g., a non-transitory computer readable storage medium) associated with an apparatus and executed by at least one processor associated with the apparatus. However, alternative embodiments are contemplated such as a system embodied as a special purpose processor. The special purpose processor can be a graphics processing unit (GPU). In other words, the user interface can be implemented in a GPU of a one-person view device (e.g., a wearable smart device, a head-mount display, and/or the like).

A GPU can be a component of a graphics card. The graphics card can also include video memory, random access memory digital-to-analogue converter (RMDAC) and driver software. The video memory can be a frame buffer that stores digital data representing an image, a frame of a video, an object of an image, or scene of a frame. A RAMDAC can be configured to read the contents of the video memory, convert the content into an analogue RGB signal and sends analog signal to a display or monitor.

The driver software can be the software code stored in the memory referred to above. The software code can be configured to implement the method described herein. Although the methods described below are described as being executed by a processor and/or a special purpose processor, the methods are not necessarily executed by a same processor. In other words, at least one processor and/or at least one special purpose processor may execute the method described below with regard to FIG. 1.

FIG. 1 illustrates a flowchart of a method for detecting a user's intent and triggering the execution of a task based on the intent according to at least one example implementation. As shown in FIG. 1, in step S110, a hand gesture is detected. For example, the computing device, including the user interface, can detect a user's hand gesture using a camera of the computing device. The camera can be a non-depth sensing camera (e.g., a two-dimensional (2D) camera) and the user interface can detect hand gestures with just one camera (in contrast to other hand gesture detection techniques which may require multiple camera inputs). In an example implementation, the user interface can be configured to detect a user's hand(s) in a pointing position from a first person perspective together with a location of the pointer (e.g., tip of a visible part of user's index finger) based on a machine learned (ML) model that is trained using a diverse set of images (e.g., 1000 s of images).

In step S120, the user's intent is determined based on, at least, the detected hand gesture. For example, the hand gesture can be the user pointing (e.g., using an index finger) at an object. In some implementations, the user interface can be configured to (e.g., using the ML model) determine the user's intent. In some implementations, for example, a ML model (e.g., a computer vision model) can be developed using the camera input of the computing device. Although computer vision models can require depth-sending camera or multi-camera inputs, the computing device may determine user's intent using a single non-depth (e.g., 2D) sensing camera input. This can allow the ML model to be implemented on computing devices with a single camera or a single non-depth sensing camera.

In step S130, a task based at least on the determined intent is triggered. For example, the user interface can trigger a task based on the determined intent. The task can be a function of the computing device. Example tasks can include taking a picture or video, increasing/decreasing volume, skipping songs, and/or the like. Although this disclosure describes using the index finger as a trigger, other fingers can be used as a trigger. The use of the index finger being used as a trigger is for illustration purposes. As described above, the ML model can be trained with a diverse set of images.

For example, if the hand gesture is a pointing finger and the finger is pointing at an object. The user's intent can be determined as to acquire some information about the object. The interface can trigger the computing device to identify the object and to perform a search based on the identified object. For example, the computing device can search for a price for the object at one or more stores.

Figure 2:
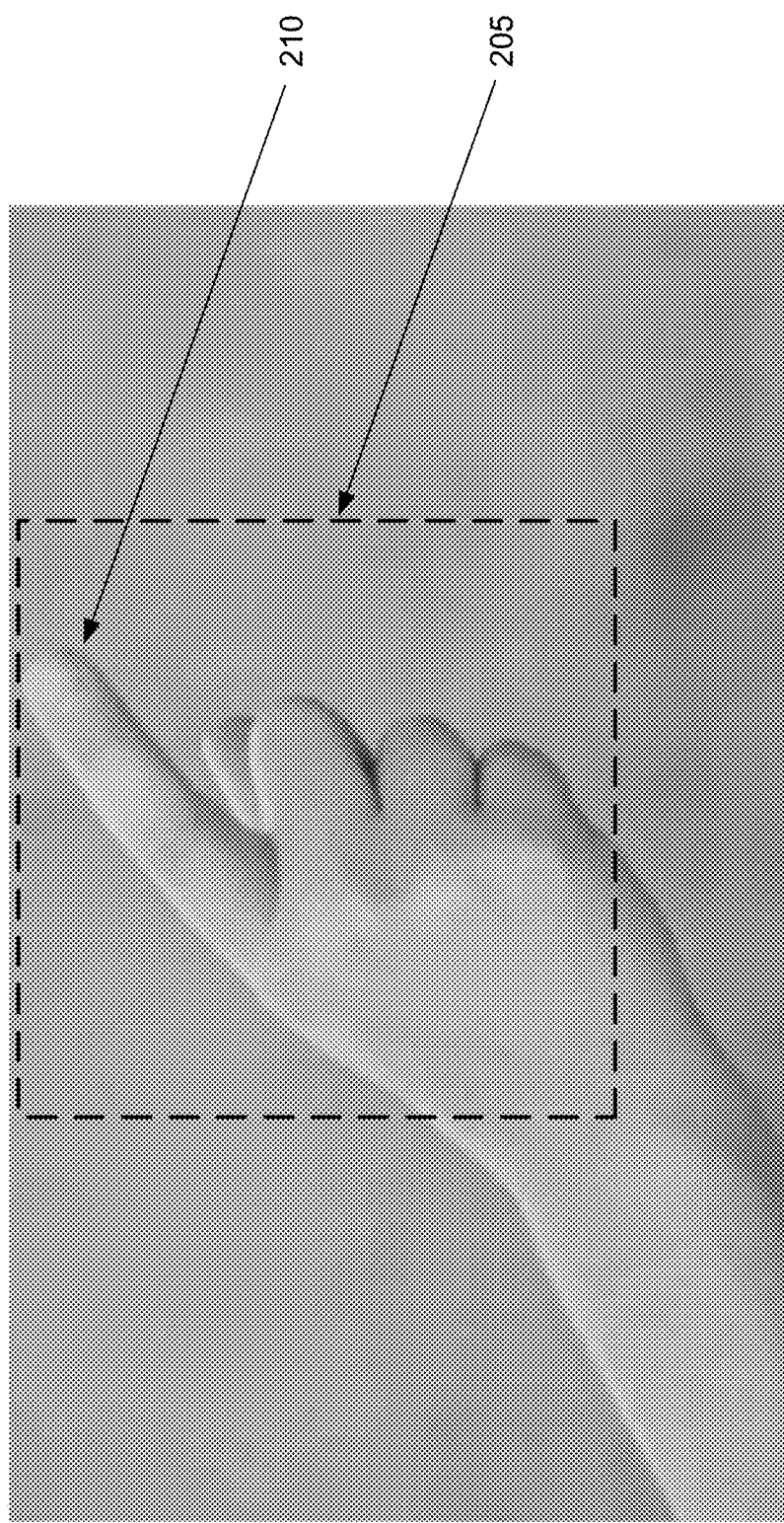
FIG. 2 illustrates a trigger for detecting hand gestures according to at least one example implementation.

FIG. 2 illustrates a trigger for detecting hand gestures according to at least one example implementation. In FIG. 2, a bounding box 205 of a user's hand having a finger 210 (e.g., an index finger) is illustrated. In an example implementation, an object being detected can cause the bounding box 205 to be generated. Generation of the bounding box 205 can trigger an identification of the object in the bounding box 205. In some implementations, the bounding box 205 can be one of a plurality of bounding boxes generated in response to receiving the image (e.g., by a ML model). The user interface can cause the capture of an image which can trigger generation of the bounding box 205 and to determine, using the captured image and the ML model that a hand is within the bounding box 205.

After identifying the object as a hand, the user interface can cause the ML model (and/or trigger another ML model) to identify a pose and/or motion of the hand. For example, the ML model can be configured to search for fingertips. Determining the hand includes the finger 210 in a pointing pose can trigger another task (e.g., as yet another ML model and/or computer code) of the user interface. The task can include determining what the finger 210 is pointing at.

Figure 3:
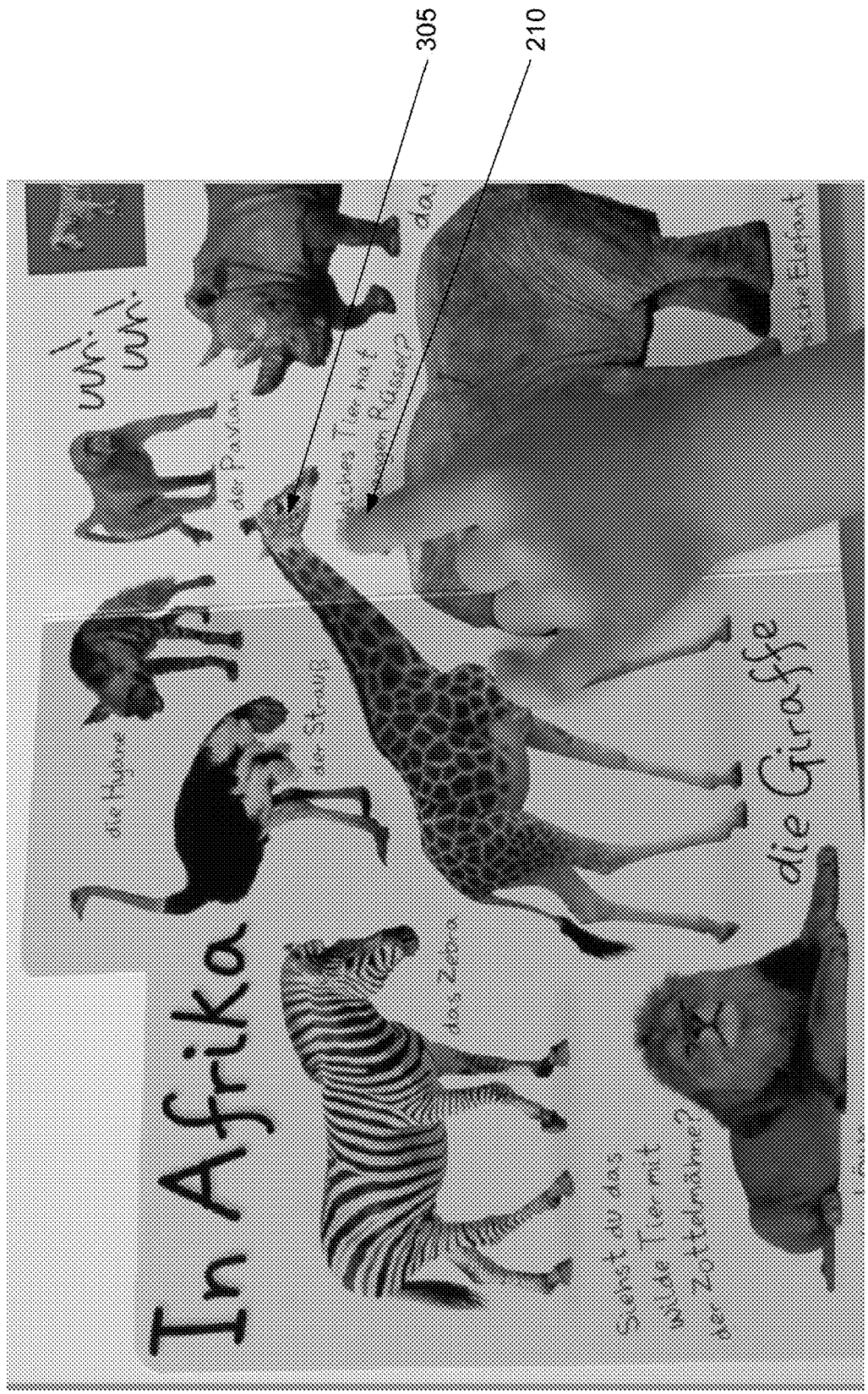
FIG. 3 illustrates determining intent based on disambiguation according to at least one example implementation.

FIG. 3 illustrates determining intent based on disambiguation according to at least one example implementation. As illustrated in the image 300 of FIG. 3, finger 210 is pointing at giraffe 305. The finger 210 pointing at an identifiable object (e.g., giraffe 305) can be used to disambiguate (remove uncertainty) and determine the user's intent using the ML model. In an example implementation, the ML model can determine that the user is likely pointing to the giraffe 305. Determine that the user is likely pointing to the giraffe 305, can trigger the user interface (e.g., based on a ML model) to cause the computing device to perform a task (e.g., search for information about a giraffe user a computer assistant).

Figure 4:
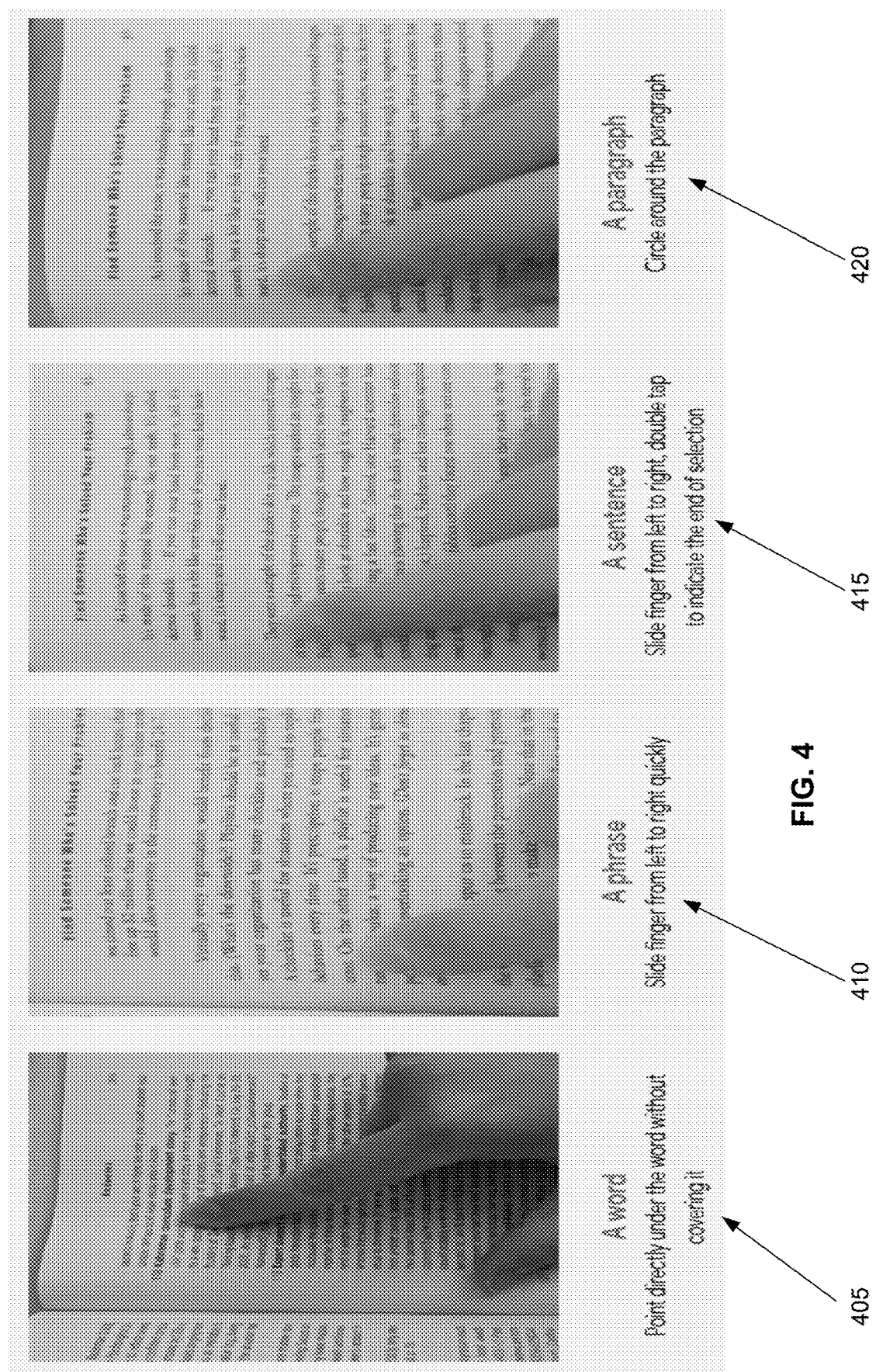
FIG. 4 illustrates pointing gestures according to at least one example implementation.

FIG. 4 illustrates pointing gestures according to at least one example implementation. For example, the ML model can determine a hand includes a pointing finger as discussed above. In this example, the ML model can determine that the user is likely pointing to text (e.g., in a book) as opposed to pointing at an object (e.g., the giraffe 305). The user's intent can be determined based on the text being pointed to and the pose and/or motion of the hand. For example, the intent could be determined as translate, read aloud, find a definition, and/or the like of the text or a portion of the text (e.g., a word, a phrase, a sentence, and/or the like). Some examples of pointing gestures (as shown in FIG. 4) can include: a) pointing to a word by pointing directly under a word without covering it (405), b) pointing to a phrase by sliding finger from left to right (410), c) pointing to a sentence by sliding the finger from left to right and double tapping to indicate the end of selection (415), d) pointing to a paragraph by circling around the paragraph (420), and the like.

In some implementations, the hand gestures can be detected in a plurality of phases, e.g., two or more phases. In other words, a first ML model and a second ML model are used to determine the intent of the user. Then, in later phases, the first ML model may not be used. For example, in a first phase, the user interface can be configured to (e.g., using a ML model) generate a bounding box (e.g., bounding box 205) to identify (or help identify) an object as a user's hand. In a second phase, the user interface can be configured to (e.g., using a ML model) determine the pose of the hand. This multi-phase approach for gesture identification can allow for continuous tracking of the user's hand (e.g., pose and motion) without re-running at least one of the phases (e.g., the first phase to identify the hand) and can make detecting hand gestures and determining intent (as well as the subsequent executing of a task) much more efficient (e.g., in terms of speed and resource utilization (e.g., processor, memory, and/or the like)).

Figure 5:
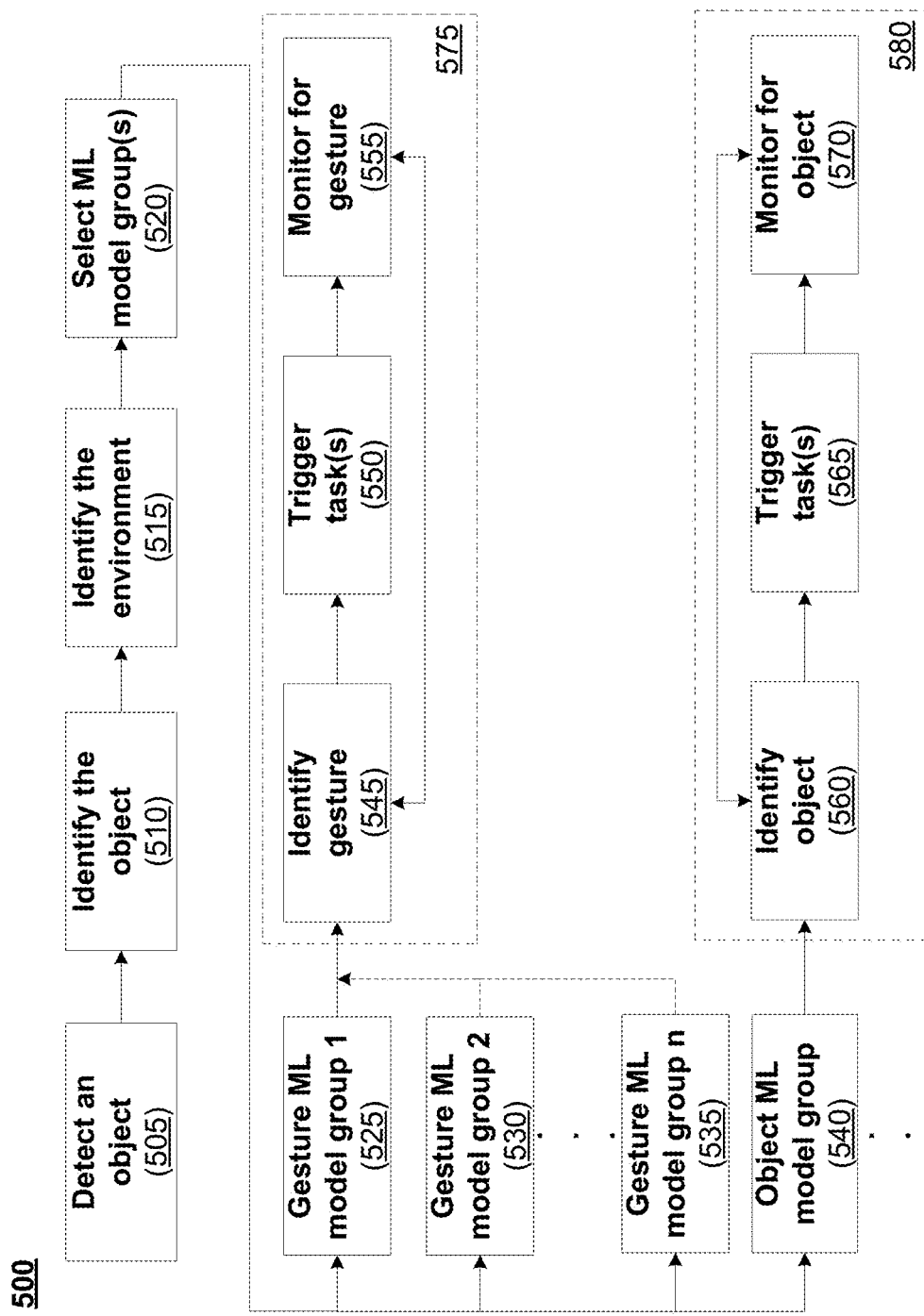
FIG. 5 illustrates a block diagram of a signal flow according to at least one example implementation.

FIG. 5 illustrates a block diagram of a signal flow according to at least one example implementation. As shown in FIG. 5, the signal flow 500 begins with a detect an object 505 block. The detect an object 505 block can be configured to monitor for and detect an object. For example, after initiating the user interface, communication with a camera of the computing device can be established. As an image(s) are captured and communicated to the user interface, the user interface can determine an object (or a new object) has come within view of the camera based on the communicated image(s). In an identify the object 510 block, the user interface can use a trained ML model to identify the object. In an example implementation, the object can be a hand (e.g., indicating the user's intent to present a hand gesture). However, the object can be, for example, a product for sale, an item in the real-world (e.g., a house, a tree, a street sign, furniture, a book, and/or the like).

In an identify the environment 515 block, the user interface can use a user indication, an application indication, a scan (using the camera) of the surroundings, and/or the like to identify the environment that the computing device is operating in. For example, the user interface could be instantiated by a computer application. The application can be a shopping application, an education application, a translation application, and/or the like. Therefore, the identify the environment 515 block, can identify the environment as a store (or other shopping location), a school (or classroom), a reading location, and/or the like.

In addition, the identify the environment 515 block can use a trained ML model to identify the environment. In order to identify an environment, a computer vision model can be trained using images of objects that can be found in various environments. The images can include desks, chairs, blackboards and/or the like for a classroom environment. The images can include desks, chairs, bookshelves, checkout stations and/or the like for a library environment. The images can include trees, vegetation, grass, animals and/or the like for an outdoor environment. An image captured by the camera of the computing device can be input to the model. A result that includes a minimum number of objects can be classified as a likely environment. For example, if the image includes several types of trees, grass, and an animal, the environment can be classified as being an outdoor environment. In addition, the ML model can use tools available to the computer device to identify a specific outdoor (or another classified environment). For example, the ML model can use location information (e.g., a global positioning system) and the classified environment to identify the environment more precisely (e.g., as a national park, a state park, a golf course, and/or the like).

In a select ML model group(s) 520 block at least one ML model can be selected based on the object and the environment. In an example implementation, the user interface can be configured to detect and respond to hand gestures. Therefore, the at least one ML model can include an ML model trained using hand gestures. The at least one ML model can include a ML model to identify a hand gesture and a model and/or algorithm that can be unique to the environment and can map the hand gesture to user intent. The at least one ML model can be configured to identify the hand gesture and map the hand gesture to a user intent for the environment in a single operation. For example, the at least one ML model can include a detection layer or block configured to identify the hand gesture and map the hand gesture to a user intent.

Further, there can be a plurality of hand gesture techniques. For example, the hand gestures could be single hand, two hand, hand and voice, and/or the like. Therefore, the signal flow 500 can include a plurality of gesture ML models shown as gesture ML model group 1 525, gesture ML model group 2 530, . . . , and gesture ML model group n 535. The dashed lines indicate that one gesture ML model is likely to be selected at a time. However, other configurations are within the scope of this disclosure. Other trained ML models may also be included in example implementations as illustrated by, but not limited to, object ML model group 540.

Combinations of trained ML models can also be used by the user interface. For example, an application developer can develop an application for a grocery store chain. Therefore, the application developer can rely on gesture ML models available to all application developers and a custom ML model (e.g., as an object ML model group 540) trained based on products available at the grocery store. A user can open the developed application which may instantiate the user interface. The user can reach out for a product causing a hand to be detected and identified (the detect an object 505 block and the identify the object 510 block). The developed application can identify the environment as the grocery store (identify the environment 515 block) and select a gesture ML model group and an object ML model group. For example, a two-hand ML model group and the custom ML model group can be selected.

The signal flow 500 can include at least one repetitive flow operation illustrated in FIG. 5 as flow 575 block and flow 580 block illustrated with dashed lines to indicate that the blocks may not necessarily be structurally together or in one location. The flow 575 block includes an identify gesture 545 block, a trigger task(s) 550 block, and a monitor for gesture 555 block. The identify gesture 545 block can be configured to receive an image from the camera of the computing device. The image can be used as an input to a learned ML model to identify the gesture. Identifying the gesture can include assigning a variable used to identify unique trained gestures.

The trigger task(s) 550 block can include instructions (e.g., computer code) that can cause the computing device to execute a task based on the identified gesture. In an example implementation, each task can be identified by a unique variable. The unique variable can be same as the variable that identifies the gesture. Alternatively, or in addition to, the unique variable can be mapped to the identified gesture or the identified gesture can be mapped to the unique variable. The task can be any task that can be performed by the computing device. For example, the task can be a search, a translation, read (e.g., text to speech), a computer assistant task, store data (e.g., an image), map data (e.g., map a business card to a contact), and/or the like.

Continuing the grocery application example described above, a gesture by the shopper can be identified and a task performed. For example, reaching out and grabbing an item can cause the display or an audible indication of the price, nutrition, or other information about the product. Further, a swiping gesture with the other hand can cause the item to be placed in the shopping cart. These tasks are just examples, other tasks are within the scope of this disclosure.

The monitor for gesture 555 block can monitor images captured and communicated by the camera. The monitor for gesture 555 block can use a trained ML model that can test the image and determine if the image is likely a gesture. If the image is likely a gesture the image can be communicated to the identify gesture 545 block. If the identify gesture 545 block identifies the image as a gesture, processing continues to the trigger task(s) 550 block. Otherwise, processing returns to the monitor for gesture 555 block. In some implementations, the signal flow can begin with flow 575 and/or flow 580. In other words, a gesture (flow 575) could be identified first (e.g., a hand and ML groups(s) can be preconfigured via an application) followed by an object (flow 560) or vice versa.

The flow 580 block includes an identify object 560 block, a trigger task(s) 565 block and a monitor for object 570 block. The identify object 560 block can use a trained ML model to identify the object. The trigger task(s) 550 block can cause some task to be performed based on the identity of the object. Continuing the grocery application example described above, the object can be identified as a product and the task can be to look up information about the product. Further, two or more ML model groups can be configured to operate together. For example, the trigger task(s) 550 block can trigger the starting of the identify object 560 block.

The monitor for object 570 block can monitor images captured and communicated by the camera. The monitor for object 570 block can use a trained ML model that can test the image and determine if the image is likely an object (e.g., an object that is different than the previously identified object). If the image is likely a object the image can be communicated to the identify object 560 block. If the identify object 560 block identifies the image as an object, processing continues to the trigger task(s) 565 block. Otherwise, processing returns to the monitor for object 570 block.

Figure 6:
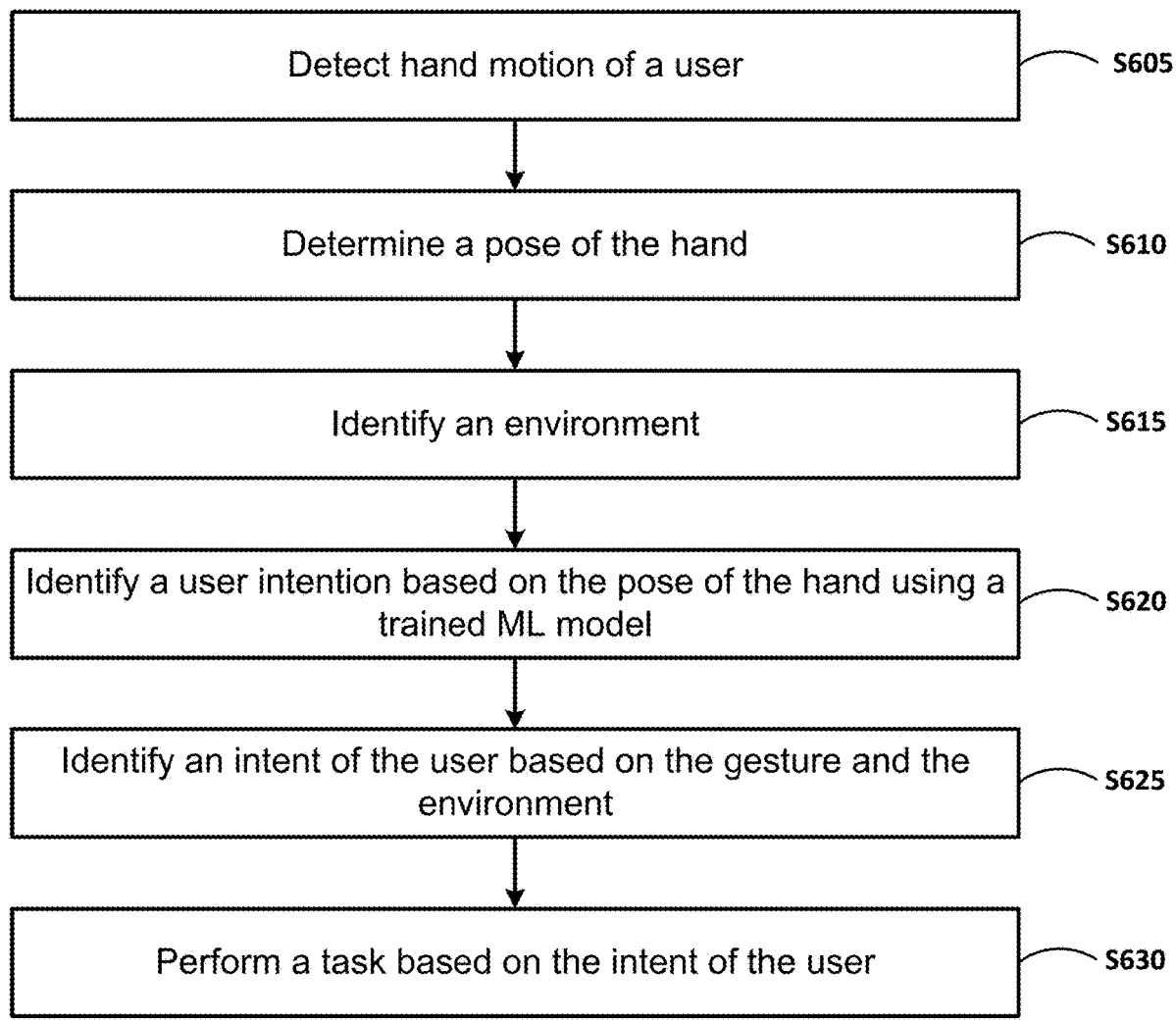
FIG. 6 illustrates a flowchart of a method

The methods described with regard to FIG. 6 can be performed due to the execution of software code stored in a memory (e.g., a non-transitory computer readable storage medium) associated with an apparatus and executed by at least one processor associated with the apparatus. However, alternative embodiments are contemplated such as a system embodied as a special purpose processor. The special purpose processor can be a graphics processing unit (GPU). In other words, the user interface can be implemented in a GPU of a one-person view device (e.g., a wearable smart device, a head-mount display, and/or the like).

A GPU can be a component of a graphics card. The graphics card can also include video memory, random access memory digital-to-analogue converter (RAMDAC) and driver software. The video memory can be a frame buffer that stores digital data representing an image, a frame of a video, an object of an image, or scene of a frame. A RAMDAC can be configured to read the contents of the video memory, convert the content into an analogue RGB signal and sends analog signal to a display or monitor.

The driver software can be the software code stored in the memory referred to above. The software code can be configured to implement the method described herein. Although the methods described below are described as being executed by a processor and/or a special purpose processor, the methods are not necessarily executed by a same processor. In other words, at least one processor and/or at least one special purpose processor may execute the method described below with regard to FIG. 6.

FIG. 6 illustrates a flowchart of a method according to at least one example implementation. As shown in FIG. 6, in step S605 hand motion of a user is detected. For example, a hand motion can be detected as a hand coming into view of a camera of a computing device. The hand motion can also be of a hand that is within the view of the camera and changes position (e.g., change a pose, move from side to side, and/or the like). The motion can indicate that a user is in the process of showing an intent.

In step S610 a pose of the hand is detected. For example, the pose can be detected as an image captured by the camera. The pose can be a finger pointing, a hand grabbing, a pinch, a circling of a finger, and/or the like.

In step S615 an environment is identified. The pose of the hand can be interpreted differently based on the environment (e.g., use case, scenario, tool, application, and/or the like). In order to determine an intention of the user (e.g., based on a hand gesture). The environment that the computing device is operating in should be determined. For example, the environment can be based on a location of the computing device, an application interacting with the user interface, and/or the like. The environment can be a store, a classroom, a reading location, a park, an outdoor space (e.g., a forest, a lake, and/or the like) and/or the like. The environment can be identified based on a user input (e.g., a voice command) or a computer application setting. For example, the user can speak out loud that he/she is reading a book, in class or to open a shopping application. Alternatively, or in addition, identification can be performed using a ML model that uses an image of the real-world environment of the computing device.

For example, in order to identify an environment, a computer vision model can be trained using images of objects that can be found in various environments. The images can include desks, chairs, blackboards and/or the like for a classroom environment. The images can include desks, chairs, bookshelves, checkout stations and/or the like for a library environment. The images can include trees, vegetation, grass, animals and/or the like for an outdoor environment. An image captured by the camera of the computing device can be input to the model. A result that includes a minimum number of objects can be classified as a likely environment. For example, if the image includes several types of trees, grass, and an animal, the environment can be classified as being an outdoor environment. In addition, the ML model can use tools available to the computer device to identify a specific outdoor (or another classified environment). For example, the ML model can use location information (e.g., a global positioning system) and the classified environment to identify the environment more precisely (e.g., as a national park, a state park, a golf course, and/or the like).

In step S620 a gesture is identified based on the pose of the hand using a trained ML model. An ML model can be trained using a plurality of hand poses that can be made by the user of a computer device. The ML model can be trained based on a plurality of images (e.g., of hand poses as gestures) and ground-truth images. For example, the pose can be captured as an image using a camera of the computing device. The image can be input to the trained ML model. The trained ML model can identify the gesture based on the image. The trained ML model can output a gesture identification (e.g., as a unique ID number).

In step S625 an intent of the user is identified based on the gesture and the environment. The ML model can include a ML model to identify a hand gesture (step S620) and a ML model and/or algorithm that can be unique to the environment and can map the hand gesture to a user intent. The at least one ML model can be configured to identify the hand gesture and map the hand gesture to a user intent for the environment in a single operation. For example, the at least one ML model can include a detection layer or block configured to identify the hand gesture and map the hand gesture to a user intent.

In an example implementation, the computer device can operate in a real-world space. Unlike a computer device executing an AR application (e.g., that can identify and respond to a limited number of gestures), example implementations can be configured to determine the intent of the user based on an unlimited number of gestures (e.g., constrained to trained gestures) and an unlimited number of environments (e.g., real-world spaces).

For example, a gesture can indicate a different user intent based on the environment. Accordingly, different environments can have different maps, look-up tables, algorithms and/or ML models that are configured to determine the intent of the user. Therefore, a map, a look-up table, an algorithm and/or a ML model can be selected based on the environment. In an example implementation, determining or identifying the user intent can include mapping the identified gesture to the user intent. Determining or identifying the user intent can include using a map to identify the user intent based on the identified gesture, the map being based on the environment. Determining or identifying the user intent can include looking-up the user intent in a look-up table based on the identified gesture (e.g., using the identified gesture as a key. Determining or identifying the user intent can include using a ML model that includes a detection layer or block configured to identify the hand gesture and map the hand gesture to a user intent.

For example, A pointing gesture within a reading (e.g., of a book) environment can indicate a different intent than a pointing gesture in a shopping environment. Therefore, the ML model and/or a map or look-up table configured to the map the hand gesture to a user intent can be different for the reading environment and the shopping environment. In other words, each ML model can have a map (e.g., a look-up table) used to determine the user's intent by mapping the gesture to a likely intent. Alternatively, an application can be configured to use a ML model configured to identify hand gestures that is available to application developers. The application can further include a map or look-up table configured to the map the hand gesture to a user intent.

In step S630 a task based on the intent of the user is performed. For example, a task can be a computer implemented task. The user's intent can be mapped to a task which is performed in response to identifying the user's intent. The task can be to output (e.g., an audible output) a definition of a word, translate a word, store information (e.g., a business card), search for information (e.g., a price, encyclopedic information, and/or the like), turn on/off an appliance, and/or the like.

Figure 7:
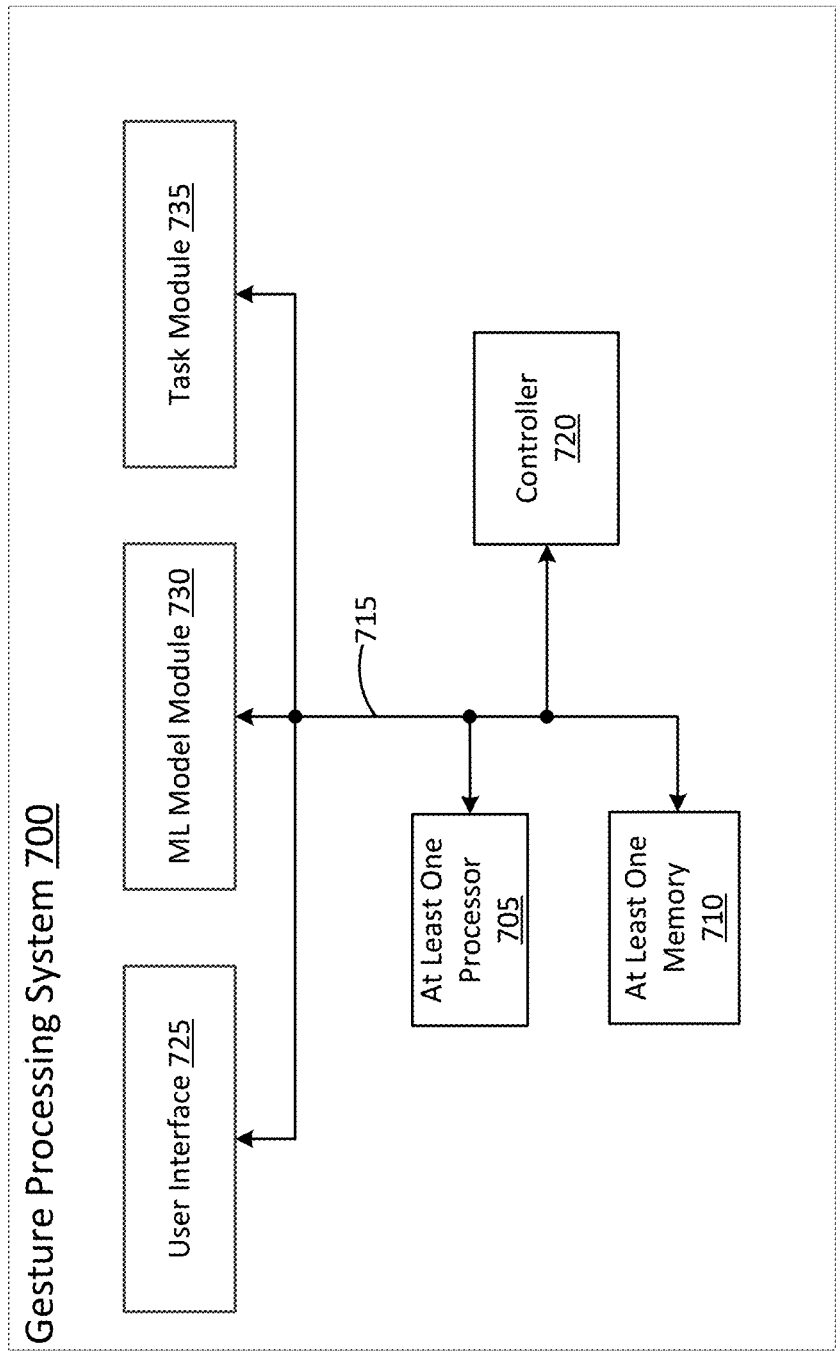
FIG. 7 illustrates a block diagram of a gesture processing system

FIG. 7 illustrates a block diagram of a gesture processing system according to at least one example embodiment. As shown in FIG. 7, a gesture processing system 700 includes at least one processor 705, at least one memory 710, a controller 720, a user interface 725, an ML model module 730, and a task module 735. The at least one processor 705, the at least one memory 710, the controller 720, the user interface 725, the ML model module 730 and the task module 735 are communicatively coupled via bus 715.

The at least one processor 705 can be utilized to execute instructions stored on the at least one memory 710, so as to thereby implement the various features and functions described herein, or additional or alternative features and functions. The at least one processor 705 can be a general-purpose processor. The at least one processor 705 can be a graphics processing unit (GPU). The at least one processor 705 and the at least one memory 710 can be utilized for various other purposes. In particular, the at least one memory 710 can represent an example of various types of memory and related hardware and software which might be used to implement any one of the modules described herein.

The at least one memory 710 can be configured to store data and/or information associated with the gesture processing system 700. For example, the at least one memory 710 can be configured to store code associated with implementing a user interface to capture and/or edit images. For example, the at least one memory 710 can be configured to store code associated with identifying a gesture, identifying and implementing a ML module, identifying and implementing a computing task, and/or the like. The at least one memory 710 can be a non-transitory computer readable medium with code that when executed by the processor 705 cause the processer 705 to implement one or more of the techniques described herein. The at least one memory 710 can be a shared resource. For example, the gesture processing system 700 can be an element of a larger system (e.g., a server, a personal computer, a mobile device, a head-mount display, smart glasses, a hands-free computer device, and the like). Therefore, the at least one memory 710 can be configured to store data and/or information associated with other elements (e.g., image/video rendering, web browsing, computer assistant, and/or wired/wireless communication) within the larger system.

The controller 720 can be configured to generate various control signals and communicate the control signals to various blocks in the gesture processing system 700. The controller 720 can be configured to generate the control signals to implement the techniques described herein. The controller 720 can be configured to control the task module 735 to execute software code to perform a computer-based process according to example embodiments. For example, the controller 720 can generate control signals corresponding to parameters to implement a search, control an application, store data, execute an ML model, train an ML model, and/or the like.

The user interface 725 can be configured to communicate with a camera of a computing device. Receive an image and/or a plurality of images from the camera and use a trained ML model to process the image. After processing the image, the user interface can be configured to identify and trigger the execution of a computer implemented task or process.

The ML model module 730 can be configured to store, train and execute at least one ML model. The ML model can be based on a convolutional neural network. The ML model can be trained for a plurality of users and/or a single user. For example, the ML model can be trained and stored on a network device. In an initialization process, the ML model can be downloaded from the network device to a local device. The ML model can be further trained before use and/or as the ML model is used by the local device.

The task module 735 can be configured to store and execute at least one computer program (e.g., computer code) configured to cause the performance of a task by the computer device. The task can cause the computer device to implement a search, control an application, control a computer assistant, interpret and store data, translate text, convert text to speech, and/or the like.

Figure 8B:
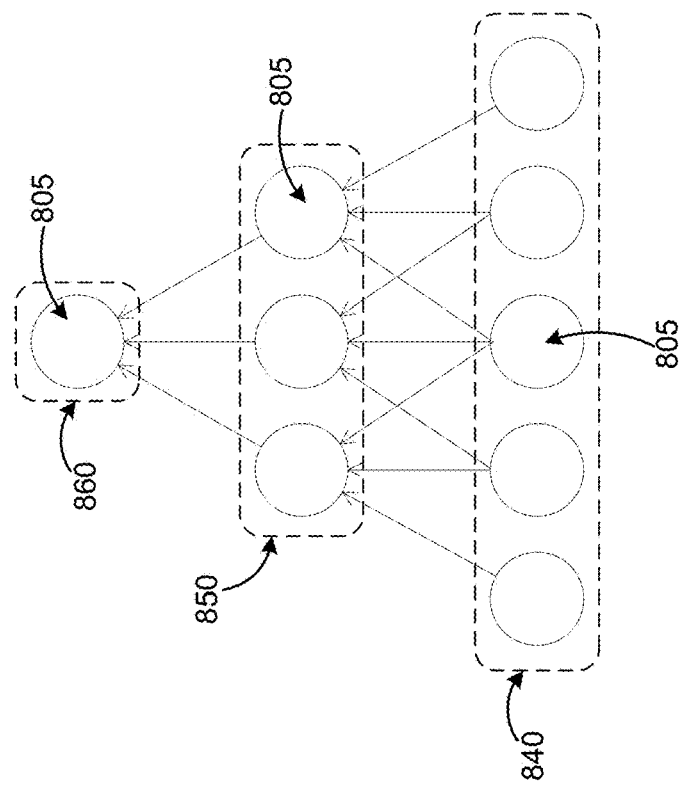
FIG. 8B illustrates layers in a convolutional neural network with sparsity constraints.
Figure 8A:
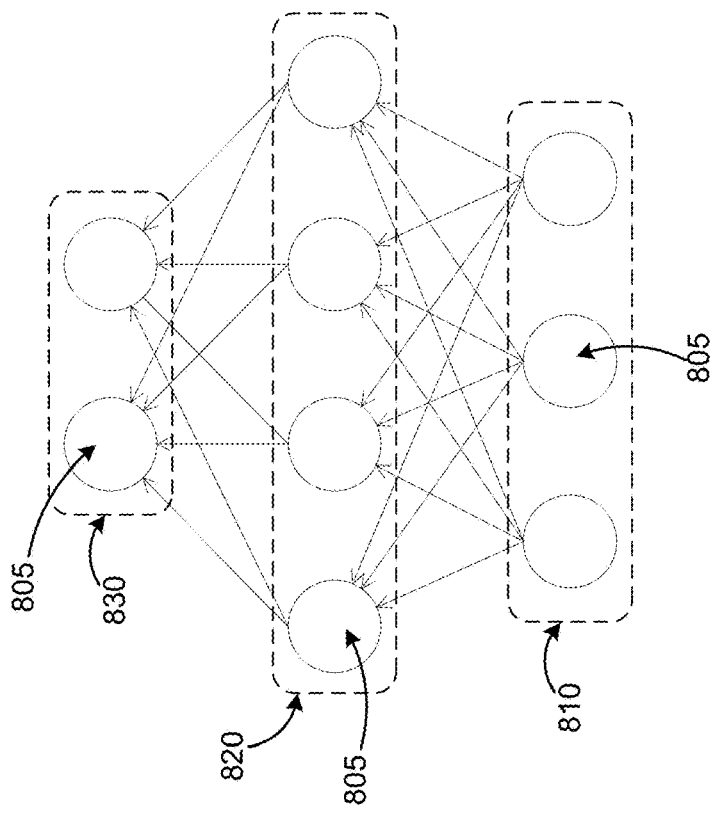
FIG. 8A illustrates layers in a convolutional neural network with no sparsity constraints.

FIG. 8A illustrates layers in a convolutional neural network with no sparsity constraints. FIG. 8B illustrates layers in a convolutional neural network with sparsity constraints. With reference to FIGS. 8A and 8B, various configurations of neural networks for use in at least one example implementation will be described. An example layered neural network is shown in FIG. 8A. The layered neural network includes three layers 810, 820, 830. Each layer 810, 820, 830 can be formed of a plurality of neurons 805. In this implementation, no sparsity constraints have been applied. Therefore, all neurons 805 in each layer 810, 820, 830 are networked to all neurons 805 in any neighboring layers 810, 820, 830.

The example neural network shown in FIG. 8A is not computationally complex due to the small number of neurons 805 and layers. However, the arrangement of the neural network shown in FIG. 8A may not scale up to larger sizes of networks due to the density of connections (e.g., the connections between neurons/layers). In other words, the computational complexity can be too great as the size of the network scales and scales in a non-linear fashion. Therefore, it can be too computationally complex for all neurons 805 in each layer 810, 820, 830 to be networked to all neurons 805 in the one or more neighboring layers 810, 820, 830 if neural networks need to be scaled up to work on inputs with a large number of dimensions.

An initial sparsity condition can be used to lower the computational complexity of the neural network. For example, if a neural network is functioning as an optimization process, the neural network approach can work with high dimensional data by limiting the number of connection between neurons and/or layers. An example of a neural network with sparsity constraints is shown in FIG. 8B. The neural network shown in FIG. 8B is arranged so that each neuron 805 is connected only to a small number of neurons 805 in the neighboring layers 840, 850, 860. This can form a neural network that is not fully connected, and which can scale to function with higher dimensional data. For example, the neural network with sparsity constraints can be used as an optimization process for a model and/or generating a model for use in rating/downrating a reply based on the user posting the reply. The smaller number of connections in comparison with a fully networked neural network allows for the number of connections between neurons to scale in a substantially linear fashion.

In some implementations neural networks that are fully connected or not fully connected but in different specific configurations to that described in relation to FIG. 8B can be used. Further, in some implementations, convolutional neural networks that are not fully connected and have less complexity than fully connected neural networks can be used. Convolutional neural networks can also make use of pooling or max-pooling to reduce the dimensionality (and hence complexity) of the data that flows through the neural network. Other approaches to reduce the computational complexity of convolutional neural networks can be used.

Figure 9:
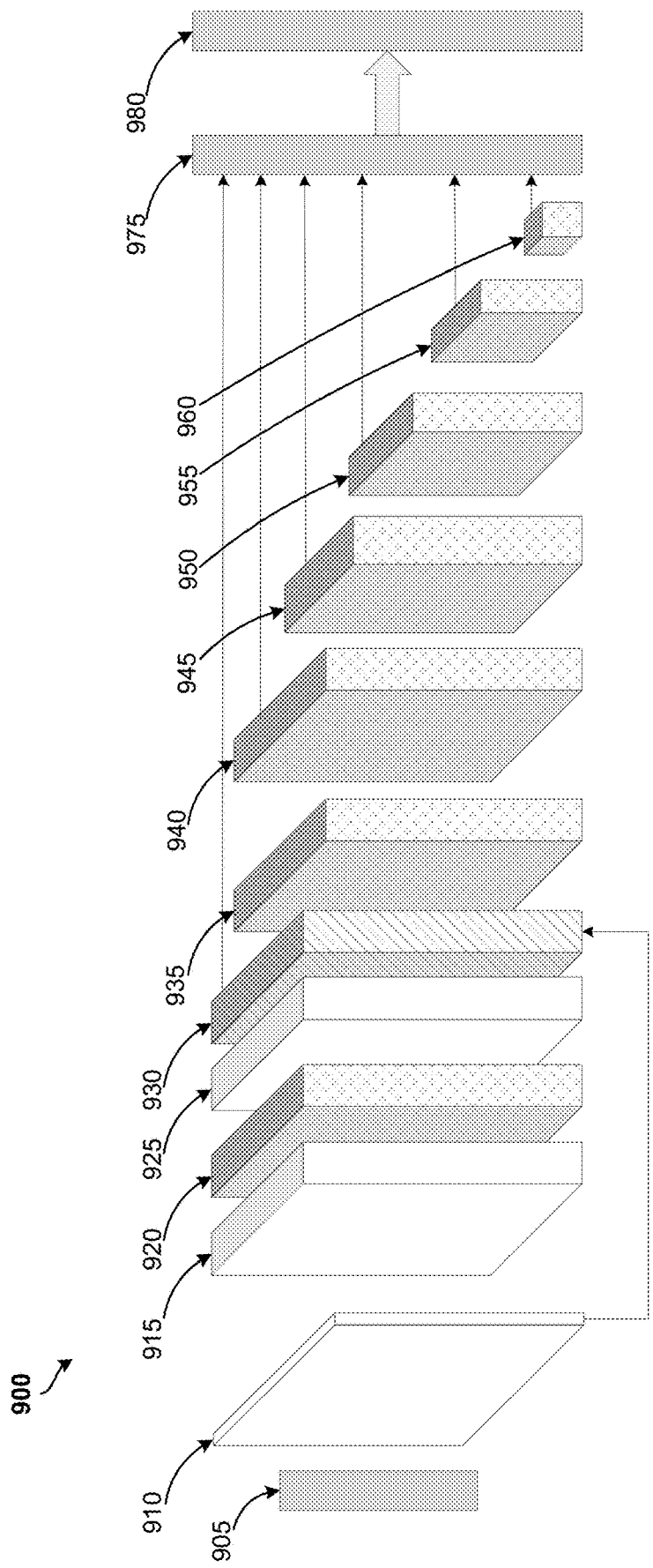
FIG. 9 illustrates a block diagram of a model according to an example embodiment.

FIG. 9 illustrates a block diagram of a model according to an example embodiment. A model 900 can convolutional neural network (CNN) including a plurality of convolutional layers 915, 920, 925, 935 940 945, 950, 955, 960 and an add layer 930. The plurality of convolutional layers 915, 920, 925, 935, 940, 945, 950, 955, 960 can each be one of at least two types of convolution layers. As shown in FIG. 9, the convolutional layers 915 and the convolution layer 925 can be a first convolution type. The convolutional layers 920, 935, 940, 945, 950, 955 and 960 can be a second convolution type. An image (not shown) can be input to the CNN. A normalize layer 905 can convert the input image into image 910 which can be used as an input to the CNN. The model 900 further includes a detection layer 975 and a suppression layer 980. The model 900 can be based on a computer vision model.

The normalize layer 905 can be configured to normalize the input image. Normalization can include converting the image to M×M pixels. In an example implementation, the normalize layer 905 can normalize the input image to 300×300 pixels. In addition, the normalization layer 905 can generate the depth associated with the image 910. In an example implementation, the image 910 can have a plurality of channels, depths or feature maps. For example, a RGB image can have three channels, a red (R) channel, a green (G) channel and a blue (B) channel. In other words, for each of the M×M (e.g., 300×300) pixels, there are three (3) channels. A feature map can have a same structure as an image. However, instead of pixels a feature map has a value based on at least one feature (e.g., color, frequency domain, edge detectors, and/or the like)

A convolution layer or convolution can be configured to extract features from an image. Features can be based on color, frequency domain, edge detectors, and/or the like. A convolution can have a filter (sometimes called a kernel) and a stride. For example, a filter can be a 1×1 filter (or 1×1×n for a transformation to n output channels, a 1×1 filter is sometimes called a pointwise convolution) with a stride of 1 which results in an output of a cell generated based on a combination (e.g., addition, subtraction, multiplication, and/or the like) of the features of the cells of each channel at a position of the M×M grid. In other words, a feature map having more than one depth or channels is combined into a feature map having a single depth or channel. A filter can be a 3×3 filter with a stride of 1 which results in an output with fewer cells each channel of the M×M grid or feature map. The output can have the same depth or number of channels (e.g., a 3×3×n filter, where n=depth or number of channels, sometimes called a depthwise filter) or a reduced depth or number of channels (e.g., a 3×3×k filter, where k<depth or number of channels). Each channel, depth or feature map can have an associated filter. Each associated filter can be configured to emphasize different aspects of a channel. In other words, different features can be extracted from each channel based on the filter (this is sometimes called a depthwise separable filter). Other filters are within the scope of this disclosure.

Another type of convolution can be a combination of two or more convolutions. For example, a convolution can be a depthwise and pointwise separable convolution. This can include, for example, a convolution in two steps. The first step can be a depthwise convolution (e.g., a 3×3 convolution). The second step can be a pointwise convolution (e.g., a 1×1 convolution). The depthwise and pointwise convolution can be a separable convolution in that a different filter (e.g., filters to extract different features) can be used for each channel or ay each depth of a feature map. In an example implementation, the pointwise convolution can transform the feature map to include c channels based on the filter. For example, an 8×8×3 feature map (or image) can be transformed to an 8×8×256 feature map (or image) based on the filter. In some implementation more than one filter can be used to transform the feature map (or image) to an M×M×c feature map (or image).

A convolution can be linear. A linear convolution describes the output, in terms of the input, as being linear time-invariant (LTI). Convolutions can also include a rectified linear unit (ReLU). A ReLU is an activation function that rectifies the LTI output of a convolution and limits the rectified output to a maximum. A ReLU can be used to accelerate convergence (e.g., more efficient computation).

In an example implementation, the first type of convolution can be a 1×1 convolution and the second type of convolution can be a depthwise and pointwise separable convolution. Each of the plurality of convolution layers 920, 935, 940, 945, 950, 955, 960 can have a plurality of cells and at least one bounding box per cell. Convolution layers 915, 920, 925 and add layer 930 can be used to transform the image 910 to a feature map that is equivalent in size to a feature map of the Conv_3 layer of the VGG-16 standard. In other words, convolution layers 915, 920, 925 and add layer 930 can transform the image 910 to a 38×38×512 feature map. Convolution layers 935, 940, 945, 950, 955, 960 can be configured to incrementally transform the feature map to a 1×1×256 feature map. This incremental transformation can cause the generation of bounding boxes (regions of the feature map or grid) of differing sizes which can enable the detection of objects of many sizes. Each cell can have at least one associated bounding box. In an example implementation, the larger the grid (e.g., number of cells) the fewer the number of bounding boxes per cell. For example, the largest grids can use three (3) bounding boxes per cell and the smaller grids can use six (6) bounding boxes per cell.

The detection layer 975 receives data associated with each bounding box. The data can be associated with the features in the bounding box. The data can indicate an object in the bounding box (the object can be no object or a portion of an object). An object can be identified by its features. The data, cumulatively, is sometimes called a class or classifier. The class or classifier can be associated with an object. The data (e.g., a bounding box) can also include a confidence score (e.g., a number between zero (0) and one (1)).

After the CNN processes the image, the detection layer 975 can receive and include a plurality of classifiers indicating a same object. In other words, an object (or a portion of an object) can be within a plurality of overlapping bounding boxes. However, the confidence score for each of the classifiers can be different. For example, a classifier that identifies a portion of an object can have a lower confidence score than a classifier that identifies a complete (or substantially complete) object. The detection layer 975 can be further configured to discard the bounding boxes without an associated classifier. In other words, the detection layer 975 can discard bounding boxes without an object in them.

The suppression layer 980 can be configured to sort the bounding boxes based on the confidence score and can select the bounding box with the highest score as the classifier identifying an object. The suppression layer can repeat sorting and selection process for each bounding box having a same, or substantially similar, classifier. As a result, the suppression layer can include data (e.g., a classifier) identifying each object in the input image.

In an augmented reality (AR) application, objects to be identified can be limited to objects generated by the AR application. For example, if 200 objects are used by the AR application, detection layer 975 may only include 200 detectors (e.g., similar to ground-truth boxes) to identify an object. Example implementations use trained ML models to identify any possible real-world object (e.g., hand pose, product, business card, and/or the like) to determine a user's intent. Therefore, detection layer 975 can be configured to detect and/or identify any real-world object and/or variations (e.g., pose) of the real-world object.

As described above, convolution layers 915, 920, 925 and add layer 930 can generate a 38×38×512 feature map. Each of the cells (e.g., each of the 1444 cells) can have at least three (3) bounding boxes. Therefore, at least 4332 bounding boxes can be communicated from the add layer 930 to the detection layer 975. Convolution layer 935 and convolution layer 940 can be the second type of convolution and be configured to perform a 3×3×1024 convolution and a 1×1×1024 convolution. The result can be a feature map that is 19×19×1024. Each of the cells (e.g., each of the 361 cells) can have at least six (6) bounding boxes. Therefore, at least 2166 bounding boxes can be communicated from the convolution layer 940 to the detection layer 975.

Convolution layer 945 can be the second type of convolution and be configured to perform a 3×3×512 convolution. The result can be a feature map that is 10×10×512. Each of the cells (e.g., each of the 100 cells) can have at least six (6) bounding boxes. Therefore, at least 600 bounding boxes can be communicated from the convolution layer 945 to the detection layer 975. Convolution layer 950 can be the second type of convolution and be configured to perform a 3×3×256 convolution. The result can be a feature map that is 5×5×256. Each of the cells (e.g., each of the 25 cells) can have at least six (6) bounding boxes. Therefore, at least 150 bounding boxes can be communicated from the convolution layer 950 to the detection layer 975.

Convolution layer 955 can be the second type of convolution and be configured to perform a 3×3×256 convolution. The result can be a feature map that is 3×3×256. Each of the cells (e.g., each of the 9 cells) can have at least six (6) bounding boxes. Therefore, at least 54 bounding boxes can be communicated from the convolution layer 955 to the detection layer 975. Convolution layer 960 can be the second type of convolution and be configured to perform a 3×3×128 convolution. The result can be a feature map that is 1×1×128. The cell can have at least six (6) bounding boxes. The six (6) bounding boxes can be communicated from the convolution layer 960 to the detection layer 975. Therefore, in an example implementation, the detection layer 975 can process, at least, 7,298 bounding boxes.

However, additional bounding boxes can be added to the feature map of each convolution layer. For example, a fixed number of bounding boxes (sometimes called anchors) can be added to each feature map based on the number (e.g., M×M) cells. These bounding boxes can encompass more than one cell. The larger the number of cells, the more bounding boxes are added. The likelihood of capturing an object within a bounding box can increase as the number of bounding boxes increases. Therefore, the likelihood of identifying an object in an image can increase by increasing the number of bounding boxes per cell and/or by increasing the number of fixed boxes per feature map. Further, the bounding box can have a position on the feature map. As a result, more than one of the same object (e.g., hands, cans, dogs, cats, and/or the like) can be identified as being in an image.

In an example implementation, the model 900 can be used to detect and/or identify a hand gesture. The hand gesture can be detected and/or identified based on an object in an image that is used as an input to the model 900. The model 900 can place a plurality of bounding boxes in the image and at least one of the bounding boxes should include an object that is the hand configured in a pose that can be a hand gesture. The model 900 can be trained to detect and/or identify a plurality of hand gestures. In other words, the model can be trained (described in detail below) using a plurality of images and a plurality of ground-truth images (e.g., as ground-truth boxes). The object that is the hand configured in a pose that can be a hand gesture can be within a bounding box and the bounding box can be determined to include features that identify the hand gesture.

Once a model (e.g., model 900) architecture has been designed (and/or in operation), the model should be trained (sometimes referred to as developing the model). A model architecture can be used for several models. For example, model 900 can be used in many object identification models based on objects used to train the model. In other words, a book reading model can be developed by training model 900 using images related to book reading. A shopping model can be developed by training model 900 using images of objects (e.g., products) related to shopping. A gesture model can be developed by training model 900 using images related to hand gestures. Determining a user's intent can be based on the use of a single trained model (e.g., a ML model) and/or using multiple trained models. Performing a task based on the user's intent can be based on the use of a single trained model (e.g., a ML model) and/or using multiple trained models.

Figure 10:
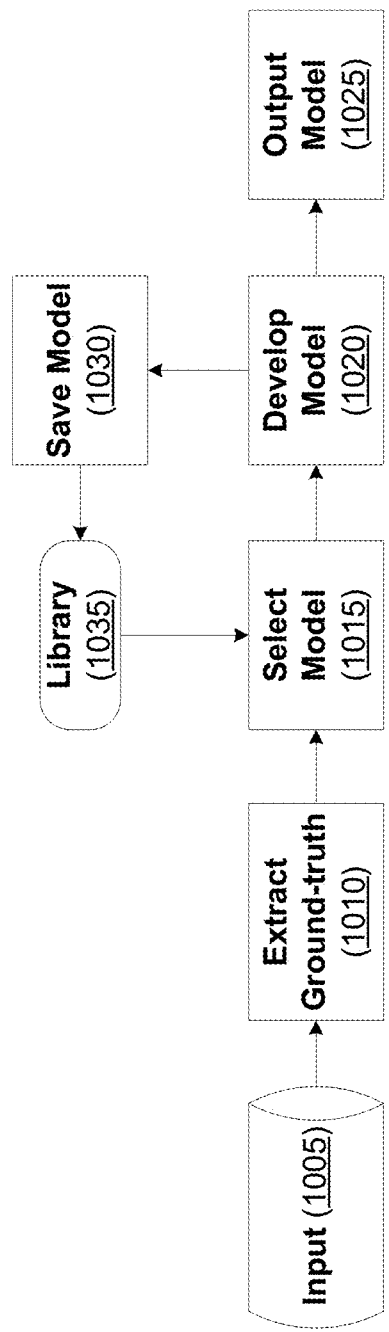
FIG. 10 illustrates a block diagram of a signal flow for a machine learning process according to an example embodiment.

FIG. 10 illustrates a block diagram of a signal flow for a machine learning process according to an example implementation. Training a model includes comparing a prediction of objects in an image to data indicating what is in the image. This data is sometimes called ground-truth. In other words, a model is used to generate bounding boxes including data associated with objects in an image. A dataset including ground-truth boxes is input to a training routine with the bounding boxes. The training routine includes comparing the generated bounding boxes to the ground-truth boxes using a loss function. The training routine can be configured to modify the model used to generate the bounding boxes based on the results of the comparison (e.g., the output of the loss function).

User data is input as input 1005. The user data can include images, gestures, objects, text, and/or the like. For example, an image can include at least one object. The image can include metadata including ground-truth boxes, data identifying the objects, data identifying the ground-truth boxes, data identifying a ML model and/or the like based on the objects in the image. The user data can include a plurality of ground-truth boxes representing objects that can be used for training a model. Other data may also be used. Ground-truth boxes can be extracted from, or generated based on, the data in an extract ground-truth 1010 block. The extract ground-truth 1010 block can also be configured to identify a pre-trained model or a model to be trained. Alternatively, the pre-trained model or the model to be trained can be identified by a user input. The identified model can be used to select a ML model (block 1015) from a library 1035.

The selected ML model is then developed (block 1020) to more accurately perform the desired output function (e.g., detect or identify objects in an image) on the input 1005. The output model 1025 block can then be used on the input 1005 either immediately (e.g., to continue training, or on live data (block 1025)) or in the future (e.g., in a user interface configured to determine user intent). The developed model is then saved (block 1030) in the library 1035, to be used immediately if required and/or in the future.

A model does not have to be redeveloped if similar data is input in the future. The library 1035 can grow as the system is used. For example, as users input additional gestures, different types of products or different business cards, a model for the gesture, the product or business card can be updated, revised, developed, and/or added to the library 1035.

The training and optimization process (e.g., as a function of developing a model in block 1020) can be configured to generate a bounding box (or boxes) including data associated with an object(s) in the image. The bounding box (or boxes) can be generated using the selected ML model (e.g., model 900). An object in a bounding box can be identified (or detected) using the selected ML model. The object can be identified (or detected) based on data associated with the bounding box. The data associated with the bounding box can be features extracted from a portion of the image using the ML model. The training and optimization process (e.g., as a function of developing a model in block 1020) can be configured to compare the generated bounding boxes to the ground-truth boxes using a loss function. Training can include modifying the ML model used to generate the bounding boxes based on the results of the comparison (e.g., the output of the loss function).

Modifying the ML model can include changing features and/or characteristics of features (e.g., key features or importance of a feature), hyperparameters including: boxes proposal, aspect ratios, data augmentation options, loss function, depth multiplier, number of layers, image input size (e.g., normalization), anchor boxes, location of anchor boxes, number of boxes per cell, feature map size, convolution parameters, and/or the like.

The training and optimization process (e.g., as a function of developing a model in block 1020) can be configured based on a desired trade-off between computational time spent and desired quality of results. In general, the number of iterations used during the training process yields approximately logarithmic gains in reconstruction accuracy, so it can be preferred to use an automatic threshold to stop further optimization. When favoring quality of results, the automatic threshold can be set to a predetermined value of reconstruction error, for example, by calculating the mean squared error, but other methods can also be used. The automatic threshold can be set to limit the training and optimization process to a predetermined number of iterations. Further alternative a combination of these two factors can be used.

A model can also be optimized over time. For example, a product identification goal can be to minimize misidentifications. Accordingly, minimizing misidentifications associated with each product during training (pre-use and in-use) can minimize misidentifications in an operational environment. In an example implementation, a threshold number of misidentifications can be set for each product. The threshold number can be associated with a time period (e.g., a week or a month). In response to determining a number of misidentifications associated with a product exceeds the threshold number, additional training of an associated model can be triggered. Although a threshold number is described, other criterion are within the scope of this disclosure. A model can be optimized in response to an event. For example, optimizing (or developing) a model can be triggered when a new product is added to a product-line.

In an augmented reality (AR) application, objects to be identified can be limited to objects generated by the AR application. Therefore, only one model is necessary and training the model could be unnecessary as well. For example, if 200 objects are used by the AR application, detection (e.g., detection layer 975) may only include 200 detectors (e.g., similar to ground-truth boxes) to identify an object. Example implementations use trained ML models to identify any possible real-world object (e.g., hand pose, product, business card, and/or the like) to determine a user's intent. Therefore, detection can include detecting and/or identifying any real-world object and/or variations (e.g., pose) of the real-world object.

Figure 11A:
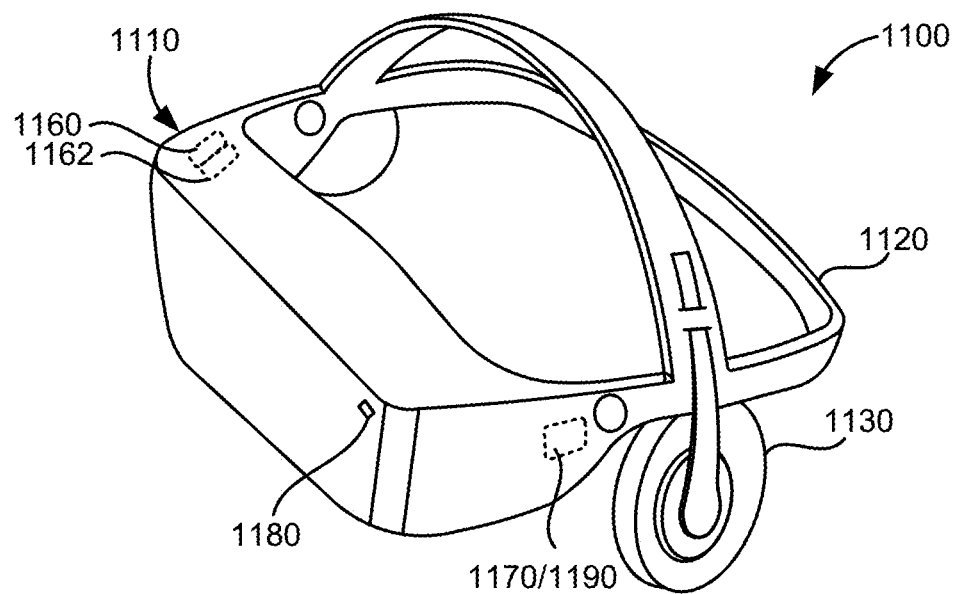
FIGS. 11A and 11B illustrate a head-mounted display device according to at least one example embodiment.
Figure 11B:
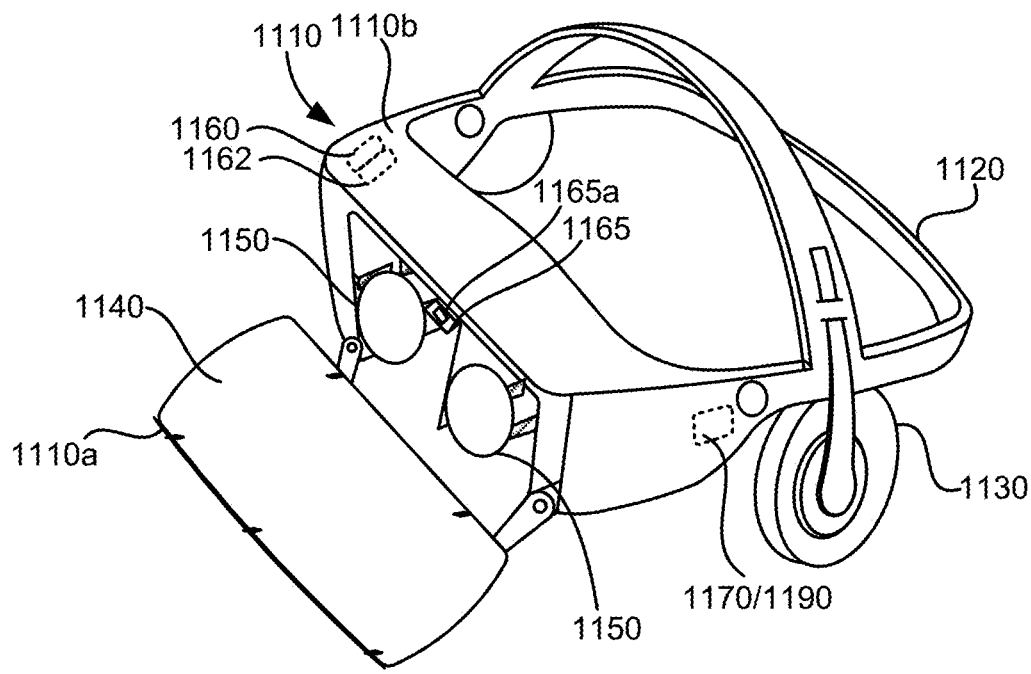

FIGS. 11A and 11B are perspective views of an example head-mounted display (HMD) 1100 worn by a user, according to at least one example implementation. The HMD 1100 may include a housing 1110 coupled to a frame 1120, with an audio output device 1130 including, for example, speakers mounted in headphones, also being coupled to the frame 1120.

In FIG. 11B, a front portion 1111A of the housing 1110 is rotated away from a base portion 1111B of the housing 1110 so that some of the components received in the housing 1110 are visible. A display 1140 may be mounted on an interior facing side of the front portion 1111A of the housing 1110. Lenses 1150 may be mounted in the housing 1110, between the user's eyes and the display 1140 when the front portion 1111A is in the closed position against the base portion 1111B of the housing 1110. In some implementations, the HMD 1100 may include a sensing system 1160 including various sensors and a control system 1170 including a processor 1190 and various control system devices to facilitate operation of the HMD 1100.

In some implementations, the HMD 1100 may include a camera 1180 to capture still and moving images. The images captured by the camera 1180 may be used to help track a physical position of the user, the HMD 1100 and/or a handheld electronic device (not shown) in the real world, or real-world space relative to the augmented environment, and/or may be displayed to the user on the display 1140 in a pass through mode, allowing the user to temporarily leave the augmented environment and return to the physical environment without removing the HMD 1100 or otherwise changing the configuration of the HMD 1100 to move the housing 1110 out of the line of sight of the user.

For example, in some implementations, the sensing system 1160 may include an inertial measurement unit (IMU) 1162 including various different types of sensors such as, for example, an accelerometer, a gyroscope, a magnetometer, and other such sensors. A position and orientation of the HMD 1100 may be detected and tracked based on data provided by the sensors included in the IMU 1162. The detected position and orientation of the HMD 1100 may allow the system to in turn, detect and track the user's head gaze direction and movement.

In some implementations, the HMD 1100 may include a gaze tracking device 1165 to detect and track an eye gaze of the user. The gaze tracking device 1165 may include, for example, an image sensor 1165a, or multiple image sensors 1165a, to capture images of the user's eyes, for example, a particular portion of the user's eyes, such as, for example, the pupil, to detect, and track direction and movement of, the user's gaze. In some implementations, the HMD 1100 may be configured so that the detected gaze is processed as a user input to be translated into a corresponding interaction in the immersive virtual experience.

In some implementations, the HMD 1100 includes a portable electronic device, such as a smartphone, that is removably disposed within a chamber of the housing 1110. For example, the display 1140 and the camera 1180 may be provided by the portable electronic device. When the chamber is closed (as shown in FIG. 11A), the display 1140 is aligned with the lenses 1150 so that a user can view at least a portion of the display 1140 (provided by the portable electronic device) through each eye. The camera 1180 may align with an aperture in the housing 1110 so that the portable electronic device of the HMD 1100 can capture images while disposed in the housing 1110.

Figure 12:
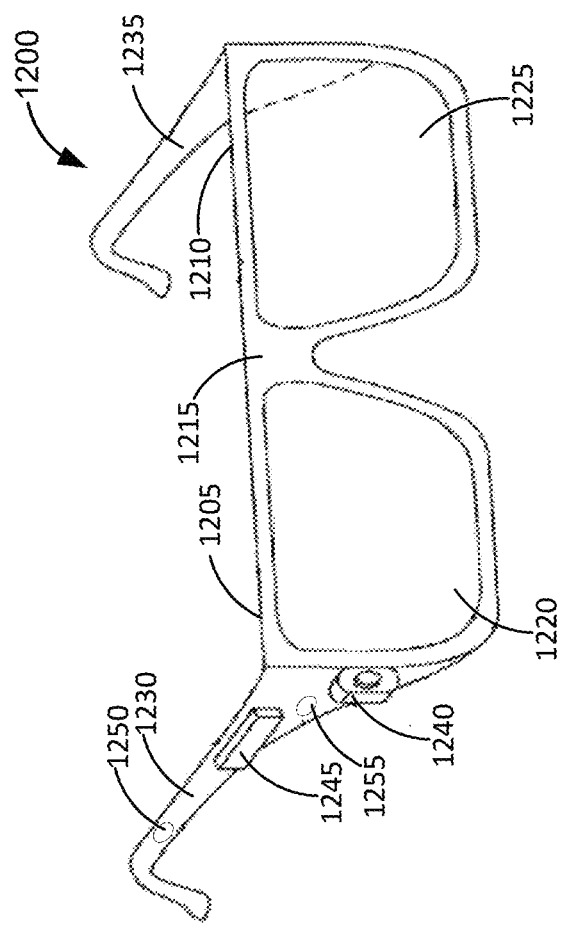
FIG. 12 illustrates a wearable computing device according to at least one example embodiment.

FIG. 12 illustrates a wearable computing device according to at least one example embodiment. As shown in FIG. 12, a wearable computing device 1200 includes lens frame 1205, lens frame 1210, center frame support 1215, lens element 1220, lens element 1225, extending side-arm 1230, extending side-arm 1235, image capture device 1240 (e.g., a camera), on-board computing system 1245, speaker 1250, and microphone 1255.

Each of the frame elements 1205, 1210, and 1215 and the extending side-arms 1230, 1235 can be formed of a solid structure of plastic and/or metal, or can be formed of a hollow structure of similar material so as to allow wiring and component interconnects to be internally routed through the wearable computing device 1200. Other materials can be possible as well. At least one of the lens elements 1220, 1225 can be formed of any material that can suitably display a projected image or graphic. Each of the lens elements 1220, 1225 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 1215 and the extending side-arms 1230, 1235 are configured to secure the wearable computing device 1200 to a user's face via a user's nose and ears, respectively. The extending side-arms 1230, 1235 can each be projections that extend away from the lens-frames 1205, 1210, respectively, and can be positioned behind a user's ears to secure the wearable computing device 1200 to the user. The extending side-arms 1230, 1235 can further secure the wearable computing device 1200 to the user by extending around a rear portion of the user's head. Additionally, or alternatively, for example, the wearable computing device 1200 can connect to or be affixed within a head-mounted helmet structure. Other configurations for a wearable computing device are also possible.

The on-board computing system 1245 is shown to be positioned on the extending side-arm 1230 of the wearable computing device 1200; however, the on-board computing system 1245 can be provided on other parts of the wearable computing device 1200 or can be remotely positioned from the wearable computing device 1200 (e.g., the on-board computing system 1245 could be wire- or wirelessly-connected to the wearable computing device 1200). The on-board computing system 1245 can include a processor and memory, for example. The on-board computing system 1245 can be configured to receive and analyze data from the image capture device 1240 (and possibly from other sensory devices) and generate images for output by the lens elements 1220, 1225.

The image capture device 1240 can be, for example, a camera that is configured to capture still images and/or to capture video. In the illustrated configuration, image capture device 1240 is positioned on the extending side-arm 1230 of the wearable computing device 1200; however, the image capture device 1240 can be provided on other parts of the wearable computing device 1200. The image capture device 1240 can be configured to capture images at various resolutions or at different frame rates. Many image capture devices with a small form-factor, such as the cameras used in mobile phones or webcams, for example, can be incorporated into an example of the wearable computing device 1200.

One image capture device 1240 is illustrated. However, more image capture devices can be used, and each can be configured to capture the same view, or to capture different views. For example, the image capture device 1240 can be forward facing to capture at least a portion of the real-world view perceived by the user. This forward-facing image captured by the image capture device 1240 can then be used to generate an augmented reality where computer generated images appear to interact with or overlay the real-world view perceived by the user.

Wearable computing device 1200 can be used to (e.g., the on-board computing system 1245) interpret certain gestures (e.g., by a wearer's hand or hands) as user input. For example, wearable computing device 1200 can capture hand gestures by analyzing image data from image capture device 1240, and initiate tasks that are defined as corresponding to certain gestures as discussed in more detail above and exemplified below. Further, speaker 1250 and microphone 1255 can be used as input/output components. For example, the microphone 1255 can detect speech that can be used to supplement and/or modify the intent associated with the hand gesture. The speaker can be configured to output an audible signal that can be heard by the user. The audible signal can be associated with the task associated with the task(s) that are responsive to the hand gesture. For example, the audible signal can be a beep indicating a task has been completed.

Figure 13A:
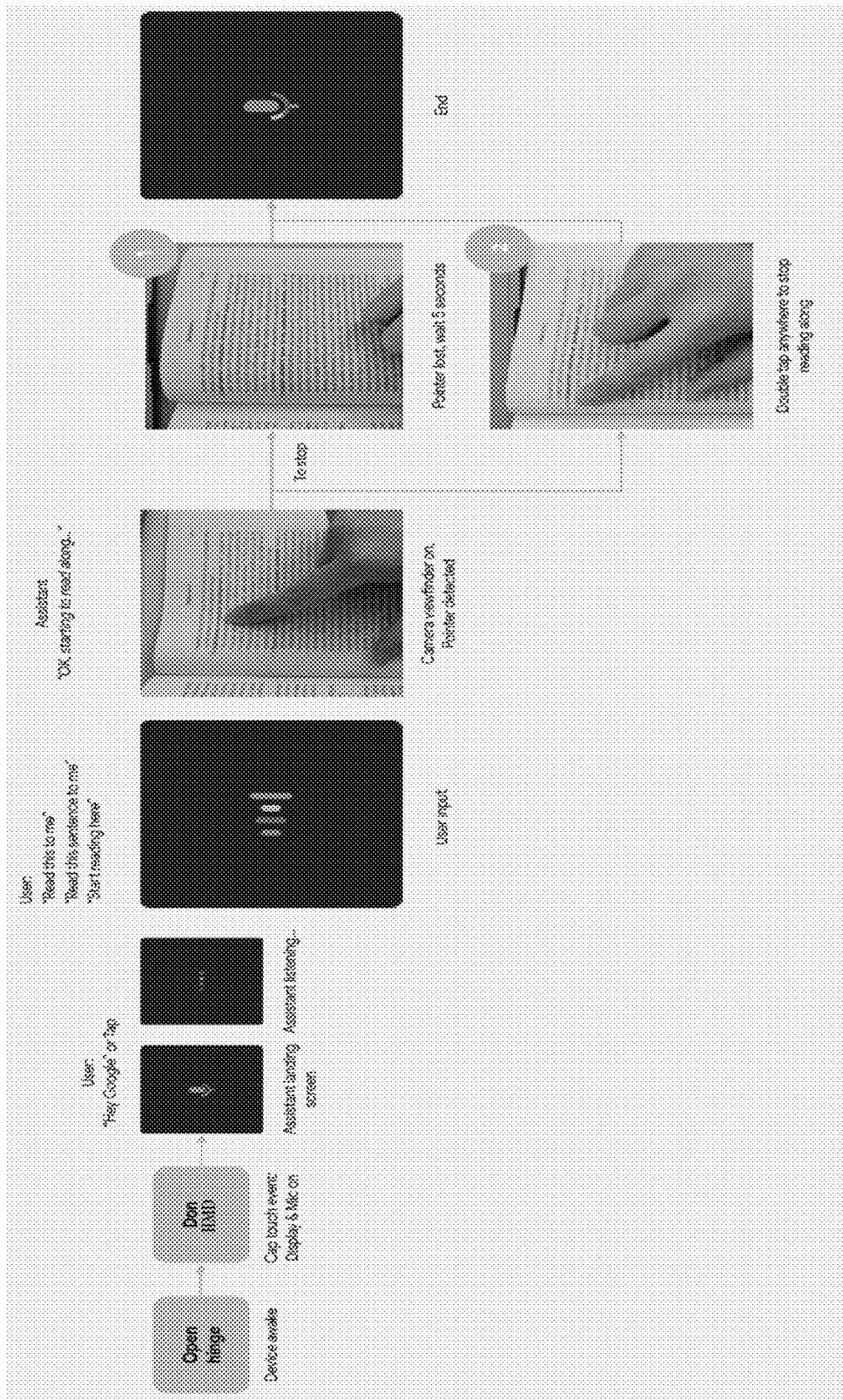
FIGS. 13A, 13B, 13C, 14A and 14B illustrate reading assistant tasks, according to example embodiments.
Figure 13B:
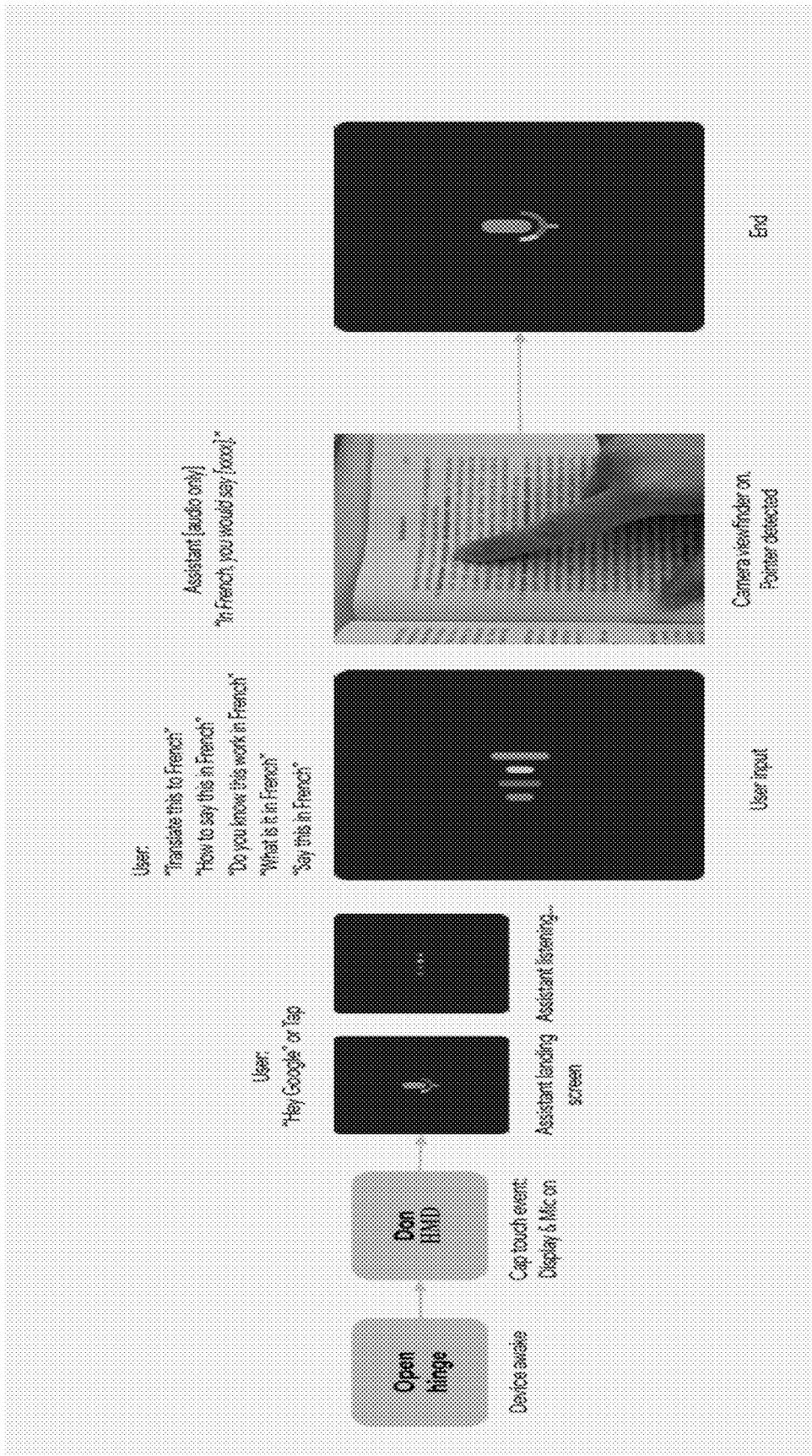
Figure 13C:
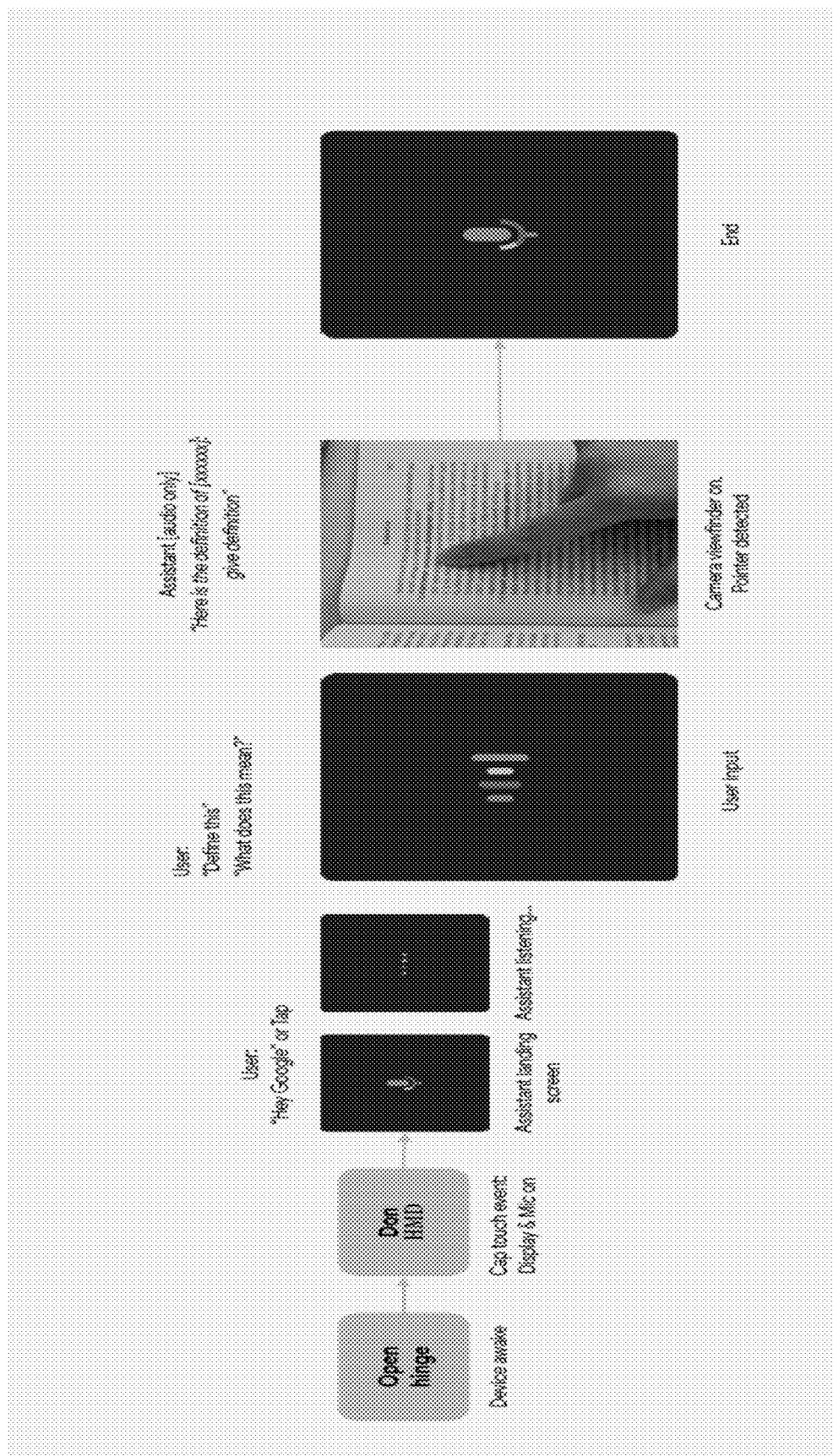
Figure 14A:
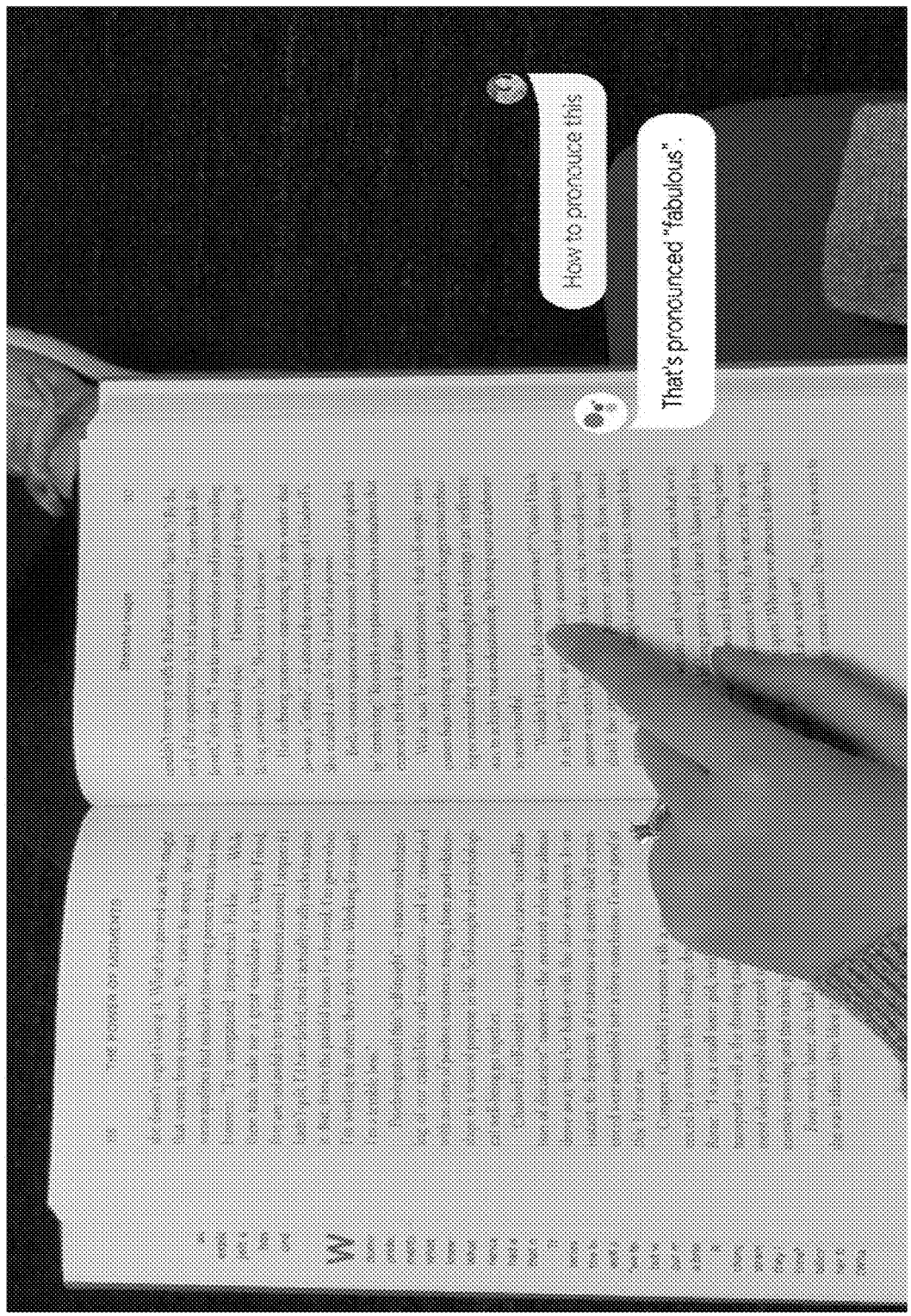
Figure 14B:
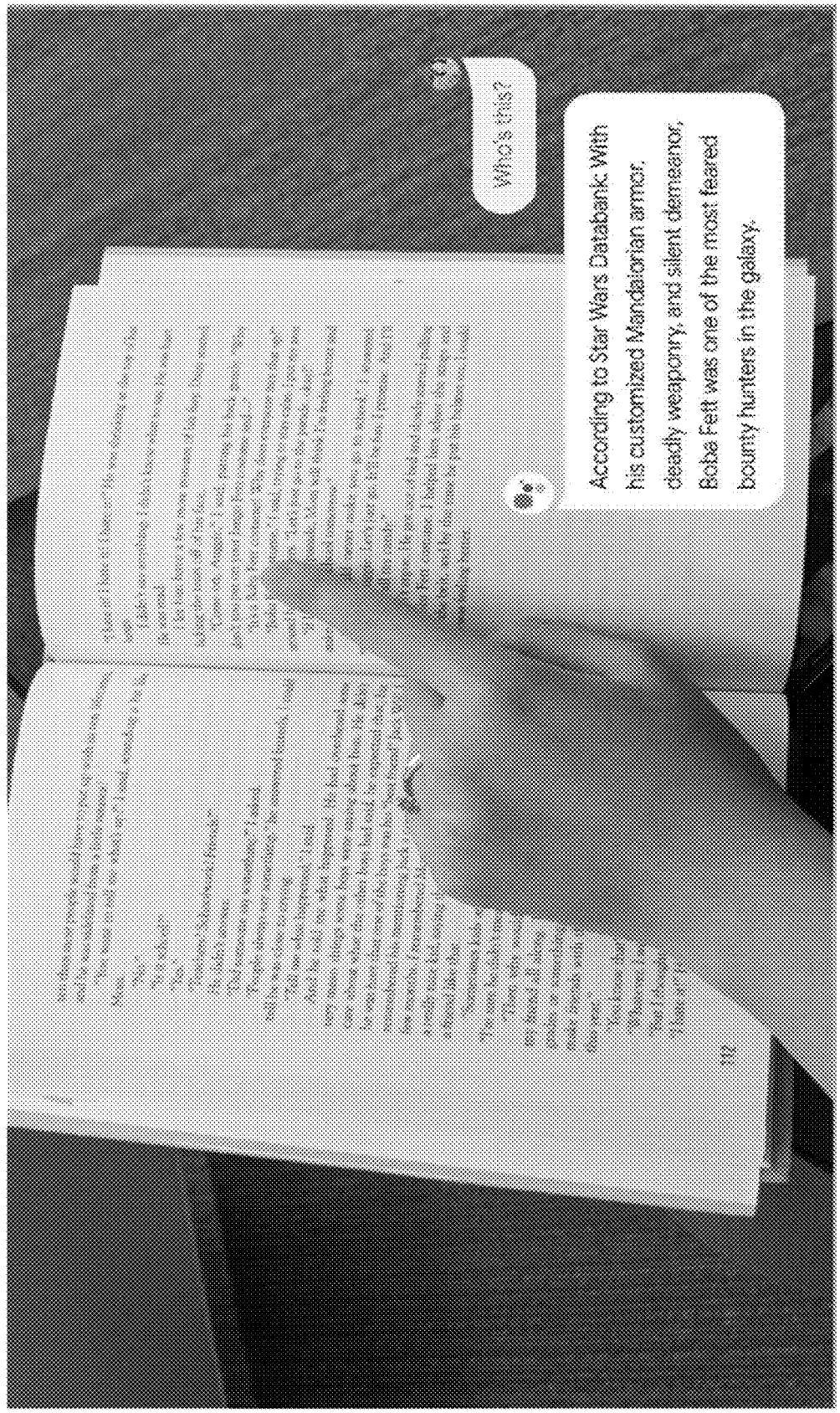

In some implementations, as illustrated by FIGS. 13A-13C and 14A-14B the user interface can determine a user's intent. In some implementations, it should be noted that the computing device may determine user's intent based on a combination of hand gestures and verbal commands from a digital assistant, as illustrated in FIGS. 13A-13C. In some implementations, the computing device may perform a task that may include assisting with pronunciation (e.g., FIG. 14A), providing information about the pointed text (e.g., FIG. 14B), and the like.

In some implementations, the user interface can perform a task that may include saving business card information in user's contacts. In some implementations, the computing device may translate text from one language to another language. These are just some example tasks and the disclosure is not limited to just these tasks.

In some implementations, the user interface can be integrated with multimodal contextual inputs. For example, the context can come from what the user is pointing at, voice task, application, historical queries, etc. and may be tied to other applications.

The techniques described herein do not require any additional hardware and requires a minimal training set to train the user interface and can solve real world scenarios. Further, the proposed mechanism may be run on basic devices (e.g., wearables, smart phones, etc.) and is device agnostic. That is, implementations can include computing devices that can be connected with any developer application that needs hand gestures.

In some implementations, frames from a camera of the computing device may be streamed in real-time to a processor of the computing device and a deep learning convolutional network of the user interface can recognize hand gestures (e.g., whitelisted hand gestures such as hand pointing, OK, stop, etc.) and its landmarks (e.g., joints). In an example implementation, battery efficiency may be improved via additional procedures for real-time tracking of the hand and landmarks. In some implementations, example use cases may include combining with voice triggered Digital Assistant. Such example use cases may include: a user pointing to some text and saying "read this text to me,' points at some piece of text and says "translate this to French," etc. Additional examples are described below.

Near Field Gestures—In some implementations, the user interface can capture user interactions in the near field, for example, with a single camera. It should be noted that unlike desktop or mobile devices where the pointer may be placed on top of an entity of interest, the hand gesture, using a computing device including the user interface, may be placed a little below the entity of interest to avoid or minimize an opaque finger covering the entity, for example, text being read, interpreted, translated, etc., as described above.

In an example implementation, the gestures may include pointing to choose/select an entity. Such implementations may include, for example, seeking assistance to translate a word while reading, saving a confirmation number or seat number from a ticket, pointing to an ingredient in a food package label, and obtaining (or retrieving) relevant information.

In an example implementation, the gestures may include sliding through to choose a set of entities. This can helpful with use cases like reading a line of text, saving (memorizing) a quote from a book, etc.

In an example implementation, the gestures may include selecting by drawing a circle or a box. This may help with choosing a larger group of entities.

In an example implementation, the gestures may include double tapping or crossing out as an interaction to cancel a task. For example, double tapping in a user's environment may be synonymous with canceling or X-ing out.

User Experience—In some implementations, the pointer hand gesture may be triggered when a device is actively taking in camera input. In an example implementation, the gesture-based intent may be registered when the computing device is ON and a hand gesture is recorded in the field of view (FOV). In an example implementation, the gesture-based intent may be registered using explicit trigger commands like "this." For instance, a translation example may include:
User: "Ok Digital Assistant, What is the meaning of this?"
   Digital Assistant (For the first N times): Point with your finger on the word or set of words.
User: Moves the finger to a word.
   Digital Assistant: Augmented reality is a technology that superimposes a computer-generated image on a user's view of the real world, thus providing a composite view.

In an example implementation, the mechanism may include explicit trigger(s) to determine the task and recognize the gesture. For instance, example User Journey may include Reading assistance (in a different language or same language). For instance, such an example implementation may include:
User: "Hey Digital Assistant, Read (Translate) this."
   Digital Assistant (For the first N times or when there is dense text): "Point to what you want to read"
User: Moves finger to a word
   Digital Assistant: "Augmented reality is a technology that superimposes a computer-generated image on a user's view of the real world, thus providing a composite view."

In an example implementation, a default language setting of the Digital Assistant may be used to read the text for translation.

Advanced learning (definition, synonyms, pronunciation, etc.)—In some implementations, advanced learning may be supported. For instance, such an example implementation may include:
User: "Hey Digital Assistant. What does this word mean" and points finger to a word
   Digital Assistant: "Diaspora means . . . . ."
User: "Ok Digital Assistant. How do I pronounce this" and points to a word
   Digital Assistant: "This word is pronounced as /'rändə' voo, 'rändā' voo/.Would you like me to repeat it?"
User: "Hey Digital Assistant. Can you tell me a synonym of this word?" and points to a word (for example, augmentation).
Digital Assistant: "The synonym of augmentation is amplification".

Object identification to disambiguate products—In some implementations, object identification to disambiguate products may be supported. For instance, such an example implementation may include:
User: "Hey Digital Assistant. What is this?" points to an object in a shopping aisle
Digital Assistant: "This is teriyaki ginger sauce"
Superhuman memory—In some implementations, superhuman memory may be supported. For instance, such an example implementation may include:
User: "Ok Digital Assistant. Remember this quote." Moving finger across a phrase or circling a phrase.
   Digital Assistant: "Saving note to your keep: The time is always right to do what is right."
Information seeker—An example implementation may include:
User: "Hey Digital Assistant. Tell me more about this." pointing to an ingredient in a product.
   Digital Assistant: "Omega3 fatty acids are polyunsaturated fatty acids characterized by a double bond three atoms away from the terminal methyl group."

In some implementations, hand gestures may support diverse user for most of their needs. For instance, such example implementations may include: identifying pointers on both index fingers and thumb (e.g., thumb is common when holding up an object), training on both left and right hand, training for multiple skin colors, length of fingers and nails, training when there are art and accessories on the finger like nail paint, jewelry, etc.

In some implementations, advanced intents in a near field view may be supported. Such example implementations may include pinch and open to zoom an entity, raise hands to stop voice of Digital Assistant, swipe hand left and right to move forward and backward respectively, thumbs up to indicate ok.

In some implementations, the field of view may be expanded to support longer distances than the length of the hand. In an example implementation, such functionality may be supported with more than one camera which can help triangulate the gesture a user may be is referring to in a far field of view. The interactions of pointing, swiping etc. may be similar as described above, however, the finger may overlay on the object behind it. Additional functionality may be supported, e.g., grab and drag to move virtual objects in the field of view.

Figure 15:
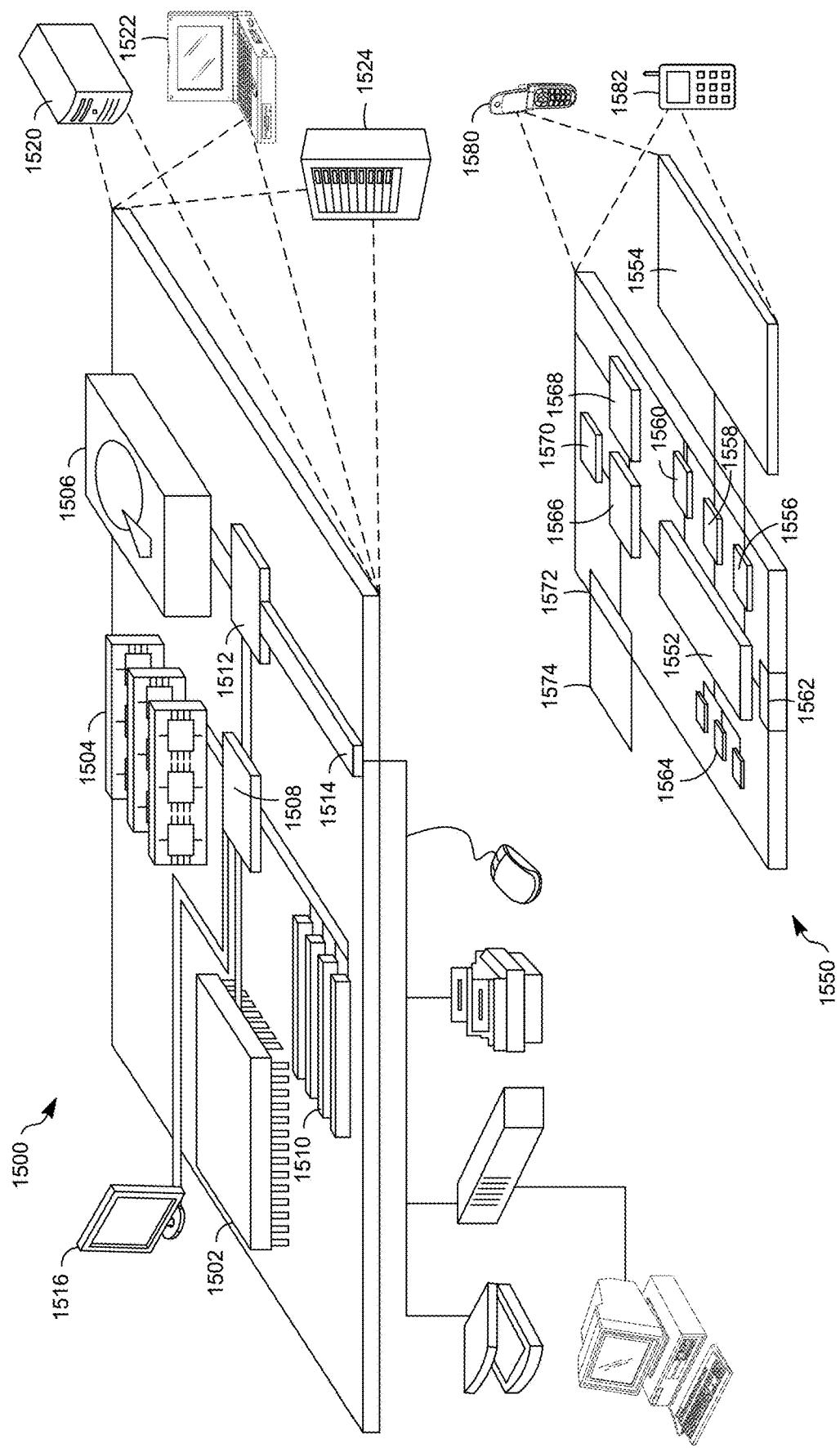
FIG. 15 shows an example of a computer device and a mobile computer device according to at least one example embodiment.

FIG. 15 shows an example of a computer device 1500 and a mobile computer device 1550, which can be used with the techniques described here. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and can be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses can be used, as appropriate, along with multiple memories and types of memory. Also, multiple computing devices 1500 can be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high-speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1500 can be implemented in a number of different forms, as shown in the figure. For example, it can be implemented as a standard server 1520, or multiple times in a group of such servers. It may also be implemented as part of a rack server system 1524. In addition, it can be implemented in a personal computer such as a laptop computer 1522. Alternatively, components from computing device 1500 can be combined with other components in a mobile device (not shown), such as device 1550. Each of such devices may contain one or more of computing device 1500, 1550, and an entire system can be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components can be mounted on a common motherboard or in other manners as appropriate.

The processor 1552 can execute instructions within the computing device 1550, including instructions stored in the memory 1564. The processor can be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 can be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 can be provide in communication with processor 1552, to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 can be provide as a security module for device 1550, and can be programmed with instructions that permit secure use of device 1550. In addition, secure applications can be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that can be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, Wi-Fi, or other such transceiver (not shown). In addition, GPS (Global Positioning System) receiver module 1570 may provide additional navigation- and location-related wireless data to device 1550, which can be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 can be implemented in a number of different forms, as shown in the figure. For example, it can be implemented as a cellular telephone 1580. It may also be implemented as part of a smart phone 1582, personal digital assistant, or other similar mobile device.

In a general aspect, a device, a system, a non-transitory computer-readable medium (having stored thereon computer executable program code which can be executed on a computer system), and/or a method can perform a process with a method including capturing an image, determining an environment that a user is operating a computing device, detecting a hand gesture based on an object in the image, determining, using a machine learned model, an intent of a user based on the hand gesture and the environment, and executing a task based at least on the determined intent.

The system can include a memory storing a set of instructions, and a processor configured to execute the set of instructions to cause the system to capture an image, determine an environment that a user is operating a computing device, detect a hand gesture based on an object in the image, determine, using a machine learned model, an intent of a user based on the hand gesture and the environment, and execute a task based at least on the determined intent.

Implementations can include one or more of the following features. For example, determining the intent of the user can further include translating an interaction of the user with a real-world, and using the interaction and the hand gesture to determine the intent of the user. The machine learned model can be based on a computer vision model. A first machine learned model and a second machine learned model can be used to determine the intent of the user. The method can further include continuous tracking of a hand associated with the hand gesture using the second machine learned model. The image can be captured using a single non-depth sensing camera of a computing device. The task can be based on use of a computer assistant. The task can include at least one of a visual and audible output. The machine learned model can be trained using a plurality of images including at least one hand gesture, the machine learned model is trained using a plurality of ground-truth images of hand gestures, a loss function is used to confirm a match between a hand gesture and a ground-truth image of a hand gesture, and the detecting of the hand gesture based on the object in the image includes matching the object to the hand gesture matched to the ground-truth image of the hand gesture. The machine learned model can be trained using a plurality of images each including at least one object, and the at least one object can have an associated ground-truth box. The machine learned model can generate a plurality of bounding boxes, the machine learned model can determine a plurality of features based on at least a portion of an object within a bounding box, the machine learned model can identify the object based on the plurality of features, and the intent of the user can be determined based on the identified object.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations can be performed in parallel, concurrently or simultaneously. In addition, the order of operations can be re-arranged. The processes can be terminated when their operations are completed, but may also have additional steps not included in the figure. The processes may correspond to methods, functions, procedures, subroutines, subprograms, etc.

Methods discussed above, some of which are illustrated by the flow charts, can be implemented by hardware, software, firmware, middleware, microcode, hardware description languages, or any combination thereof. When implemented in software, firmware, middleware or microcode, the program code or code segments to perform the necessary tasks can be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements can be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that can be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium can be magnetic (e.g., a floppy disk or a hard drive) or optical (e.g., a compact disk read only memory, or CD ROM), and can be read only or random access. Similarly, the transmission medium can be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
   capturing an image;
   determining an environment in which a user is operating a computing device;
   detecting a hand gesture based on an object in the image;
   selecting a machine learned model configured to:
      generate a bounding box,
      determine a feature based on a portion of the object within the bounding box, and
      identify the object based on the feature;
   determining, using the machine learned model, an intent of the user based on the portion of the object within the bounding box and the environment; and
   executing a task based at least on the intent of the user.

2. The method of claim 1, wherein determining the intent of the user further includes:
   translating an interaction of the user with a real-world, and
   using the interaction and the hand gesture to determine the intent of the user.

3. The method of claim 1, wherein the machine learned model is based on a computer vision model.

4. The method of claim 1, wherein
   a first machine learned model and a second machine learned model are used to determine the intent of the user, the method further comprising:
   continuous tracking of a hand associated with the hand gesture using the second machine learned model.

5. The method of claim 1, wherein the image is captured using a single non-depth sensing camera of the computing device.

6. The method of claim 1, wherein the task is based on use of a computer assistant.

7. The method of claim 1, wherein the task includes at least one of a visual and audible output.

8. The method of claim 1, wherein
   the machine learned model is trained using a plurality of images including at least one hand gesture,
   the machine learned model is trained using a plurality of ground-truth images of hand gestures,
   a loss function is used to confirm a match between a hand gesture and a ground-truth image of a hand gesture, and
   the detecting of the hand gesture based on the object in the image includes matching the object to the hand gesture matched to the ground-truth image of the hand gesture.

9. The method of claim 1, wherein
   the machine learned model is trained using a plurality of images each including at least one object, and
   the at least one object has an associated ground-truth box.

10. A system comprising:
    a memory storing a set of instructions; and
    a processor configured to execute the set of instructions to cause the system to:
       capture an image;
       determine an environment in which a user is operating a computing device;
       detect a hand gesture based on an object in the image;
       select a machine learned model configured to:
          generate a bounding box,
          determine a feature based on a portion of the object within the bounding box, and
          identify the object based on the feature;
       determine, using the machine learned model, an intent of the user based on the portion of the object within the bounding box and the environment; and
       execute a task based at least on the intent of the user.

11. The system of claim 10, wherein determining the intent of the user further includes:
    translating an interaction of the user with a real-world, and
    using the interaction and the hand gesture to determine the intent of the user.

12. The system of claim 10, wherein the machine learned model is based on a computer vision model.

13. The system of claim 10, wherein
    a first machine learned model and a second machine learned model are used to determine the intent of the user; the set of instructions are executed by the processor to further cause the system:
    continuously track of the hand using the second machine learned model.

14. The system of claim 10, wherein the image is captured using a single non-depth sensing camera of the computing device.

15. The system of claim 10, wherein the task is executed using a computer assistant.

16. The system of claim 10, wherein the task includes at least one of a visual and audible output.

17. The system of claim 10, wherein
    the machine learned model is trained using a plurality of images including at least one hand gesture,
    the machine learned model is trained using a plurality of ground-truth images of hand gestures,
    a loss function is used to confirm a match between a hand gesture and a ground-truth image of a hand gesture, and
    the detecting of the hand gesture based on the object in the image includes matching the object to the hand gesture matched to the ground-truth image of the hand gesture.

18. A non-transitory computer readable storage medium containing instructions that when executed by a processor of a computer system cause the processor to perform steps comprising:
    capturing an image;
    determining an environment in which a user is operating a computing device;
    detecting a hand gesture based on an object in the image;
    selecting a machine learned model configured to:
       generate a bounding box,
       determine a feature based on a portion of the object within the bounding box, and
       identify the object based on the feature;
    determining, using the machine learned model, an intent of the user based on the portion of the object within the bounding box and the environment; and
    executing a task based at least on the intent of the user.

* * * * *